(12) United States Patent
Dietze et al.

(10) Patent No.: US 11,208,581 B2
(45) Date of Patent: Dec. 28, 2021

(54) THERMALLY VULCANISABLE ADHESIVE AND ADHESIVE STRIP PRODUCED THEREFROM

(71) Applicant: TESA SE, Norderstedt (DE)

(72) Inventors: Sebastian Dietze, Hamburg (DE); Kim Elsenbach, Bargteheide (DE); Frank Hannemann, Hamburg (DE); Björn Zeysing, Hamburg (DE); Uwe Schümann, Pinneberg (DE); Matthias Seibert, Hamburg (DE); Katja Meyer, Hamburg (DE); Bernd Dietz, Ammersbek (DE); Jasmin Flucke, Hamburg (DE); Amy Kaus, Ferndale, MI (US)

(73) Assignee: TESA SE, Norderstedt (DE)

( * ) Notice: Subject to any disclaimer, the term of this patent is extended or adjusted under 35 U.S.C. 154(b) by 117 days.

(21) Appl. No.: 16/336,376

(22) PCT Filed: Sep. 12, 2017

(86) PCT No.: PCT/EP2017/072848
§ 371 (c)(1),
(2) Date: Mar. 25, 2019

(87) PCT Pub. No.: WO2018/059931
PCT Pub. Date: Apr. 5, 2018

(65) Prior Publication Data
US 2019/0218436 A1    Jul. 18, 2019

(30) Foreign Application Priority Data

Sep. 30, 2016   (DE) .................... 10 2016 218 978.6

(51) Int. Cl.
*C09J 175/14*    (2006.01)
*C09J 7/35*    (2018.01)
(Continued)

(52) U.S. Cl.
CPC .............. *C09J 175/14* (2013.01); *B29B 7/485* (2013.01); *B29B 7/487* (2013.01); *B29B 7/603* (2013.01);
(Continued)

(58) Field of Classification Search
CPC ..... C09J 175/14; C09J 7/35; C09J 7/38; C09J 11/04; C09J 11/06; C09J 2301/408;
(Continued)

(56) References Cited

U.S. PATENT DOCUMENTS 3,427,366 A * 2/1969 Ryan ....................... C08L 75/04
525/126
3,515,773 A   6/1970 Dahl
(Continued)

FOREIGN PATENT DOCUMENTS

DE    16 45 358 A1    9/1970
DE    38 30 895 A1    3/1990
(Continued)

OTHER PUBLICATIONS

Translation of Office Action dated Oct. 22, 2020, in connection with Korean Patent Application No. 10-2019-7012257.
(Continued)

*Primary Examiner* — Ling Siu Choi
*Assistant Examiner* — Ronald Grinsted
(74) *Attorney, Agent, or Firm* — Norris McLaughlin, P.A.

(57) ABSTRACT

Thermally vulcanisable, meltable adhesives and processes have a meltable polybutadiene-polyurethane, ground sulphur and optionally at least one vulcanisation accelerator, at least one filling material, at least one epoxide resin, at least one tackifier resin, bitumen, at least one softener and further auxiliary and additive materials, wherein said adhesives and processes can be thermally vulcanised within a temperature range of 130° C. to 230° C., such that same, as well as an
(Continued)

adhesive strip produced from same, can be used for adhesion and/or sealing in the automotive industry, as well as in structural work on oiled sheet metal, and in the painting line on e-coated or otherwise painted sheet metal, for example, for crimp fold adhesion, for crimp fold sealing, for seam sealing, for lining adhesion, for hole closure and much more.

17 Claims, 1 Drawing Sheet

(51) Int. Cl.

| | | |
|---|---|---|
| C09J 7/38 | (2018.01) | |
| B29C 48/67 | (2019.01) | |
| B29C 48/02 | (2019.01) | |
| B29C 48/15 | (2019.01) | |
| B29C 48/40 | (2019.01) | |
| B29B 7/48 | (2006.01) | |
| B29B 7/60 | (2006.01) | |
| B29B 7/72 | (2006.01) | |
| B29B 7/84 | (2006.01) | |
| B29B 7/86 | (2006.01) | |
| B29B 7/90 | (2006.01) | |
| C08G 18/22 | (2006.01) | |
| C08G 18/32 | (2006.01) | |
| C08G 18/65 | (2006.01) | |
| C08G 18/69 | (2006.01) | |
| C08G 18/75 | (2006.01) | |
| C08G 18/87 | (2006.01) | |
| C09J 11/04 | (2006.01) | |
| C09J 11/06 | (2006.01) | |
| B29C 48/00 | (2019.01) | |
| C08K 3/011 | (2018.01) | |
| C08K 3/013 | (2018.01) | |
| C08K 3/06 | (2006.01) | |
| C08K 5/40 | (2006.01) | |
| C08K 5/47 | (2006.01) | |
| C08L 63/00 | (2006.01) | |

(52) U.S. Cl.
CPC .............. *B29B 7/726* (2013.01); *B29B 7/845* (2013.01); *B29B 7/86* (2013.01); *B29B 7/90* (2013.01); *B29C 48/022* (2019.02); *B29C 48/15* (2019.02); *B29C 48/402* (2019.02); *B29C 48/67* (2019.02); *C08G 18/227* (2013.01); *C08G 18/3206* (2013.01); *C08G 18/6588* (2013.01); *C08G 18/69* (2013.01); *C08G 18/755* (2013.01); *C08G 18/758* (2013.01); *C08G 18/87* (2013.01); *C09J 7/35* (2018.01); *C09J 7/38* (2018.01); *C09J 11/04* (2013.01); *C09J 11/06* (2013.01); *B29K 2875/00* (2013.01); *C08K 3/011* (2018.01); *C08K 3/013* (2018.01); *C08K 3/06* (2013.01); *C08K 5/40* (2013.01); *C08K 5/47* (2013.01); *C08L 63/00* (2013.01); *C09J 2301/408* (2020.08)

(58) Field of Classification Search
CPC ....... B29C 48/67; B29C 48/022; B29C 48/15; B29C 48/402; B29B 7/485; B29B 7/487; B29B 7/603; B29B 7/726; B29B 7/845; B29B 7/86; B29B 7/90; C08G 18/227; C08G 18/3206; C08G 18/6588; C08G 18/69; C08G 18/755; C08G 18/758; C08G 18/87; C08K 3/011; C08K 3/013; C08K 3/06; C08K 5/40; C08K 5/47; B29K 2875/00; C08L 63/00
USPC .......................................................... 428/343
See application file for complete search history.

(56) References Cited

U.S. PATENT DOCUMENTS

| | | |
|---|---|---|
| 3,743,617 A | 7/1973 | Kest |
| 4,343,339 A | 8/1982 | Schwindt et al. |
| 5,057,553 A | 10/1991 | Zagefka et al. |
| 5,149,742 A * | 9/1992 | Hemel ................... C08G 18/69 524/426 |
| 5,684,089 A | 11/1997 | Lanoye et al. |
| 6,063,494 A | 5/2000 | Schümann et al. |
| 6,472,475 B1 | 10/2002 | Lanoye et al. |
| 2003/0149179 A1 | 7/2003 | Chao et al. |
| 2011/0111221 A1* | 5/2011 | Schumann ......... C08G 18/6674 428/355 N |

FOREIGN PATENT DOCUMENTS

| | | |
|---|---|---|
| EP | 0005213 A1 | 11/1979 |
| EP | 0 009 613 A1 | 4/1980 |
| EP | 0 356 715 B1 | 6/1993 |
| EP | 0 877 069 B1 | 6/2000 |
| JP | 59 23 0076 A | 12/1984 |
| WO | 1998/030648 A1 | 7/1998 |
| WO | 2018/059931 A1 | 4/2018 |

OTHER PUBLICATIONS

International Search Report dated Nov. 3, 2017, dated Nov. 14, 2019.
Satas, "Handbook of Pressure Sensitive Adhesive Technology", Third Edition, (1999), pp. 153-203.

* cited by examiner

THERMALLY VULCANISABLE ADHESIVE AND ADHESIVE STRIP PRODUCED THEREFROM

This application is a 371 of PCT/EP2017/072848, filed Sep. 12, 2017, which claims foreign priority benefit under 35 USC 119 of the German Patent Application No. 10 2016 218 978.6, filed Sep. 30, 2016, the disclosures of which are incorporated herein by reference.

The present invention relates to a thermally vulcanizable, meltable, preferably pressure-sensitive adhesive, to a process for producing it, to an adhesive tape comprising the adhesive, and to a process for producing the adhesive tape. The invention may be used as adhesive tape or sealing tape or as part of an adhesive or sealing tape in the automotive industry in bodyshell construction for application to oiled metal panels or in the finishing operation for application to painted metal panels, more particularly to CEC panels, but also in other sectors in which operating temperatures between 130° C. and 230° C. are available.

Thermally vulcanizable pressure-sensitive adhesive tapes are known. EP 877069 B1 (Beiersdorf) describes a pressure-sensitively adhesive film based on a thermally vulcanizable, polyesterified rubber. A disadvantage of this is that the polyesterification reaction leads to a crossed elastomer, and so compounding of the fully reactive elastomer with vulcanizing auxiliaries, fillers and further constituents is not possible. These substances must therefore be incorporated by dispersion and/or mixed in beforehand, before the crosslinking reaction has progressed. At this point in time, the reaction mixture is pasty or liquid at room temperature. The polymer is formed only during the coating procedure, by gradual advance of the crosslinking reaction. This has the advantage that the coating speed is limited, since in the state in which it is still liquid or pasty, the reaction mixture, coated onto a release liner or onto a carrier material, cannot be wound up, or at least not with constant layer thickness. Only solid polymer films can be wound up with constant layer thickness. It is therefore necessary to wait until the reaction has progressed to the point of solidification of the reaction mixture before the reaction product can be wound. The coating speed has to be set at a correspondingly slow rate.

Moreover, polyesterified rubbers have the potential disadvantage of easy hydrolytic cleaveability.

The rubber described in German laid-open specification DE 38 30 895 A (Hüls), which is composed of at least two starting polymers which are linked chemically to one another by ester groups and of which at least one is olefinically unsaturated, has in principle similar disadvantages as a possible base elastomer of a thermally vulcanizable pressure-sensitive adhesive tape. The same is true of the liquid or spreadable, vulcanizable rubber mixture described in EP 0 356 715 B1 (Henkel), which is based on polyesterified polymers of which at least one is olefinically unsaturated.

Alternatively, polybutadiene-based polyurethanes might form a possible base elastomer for thermally vulcanizable adhesive tapes. A polybutadiene-polyurethane pressure-sensitive adhesive is described in JP 59230076A (Sekisui). A polybutadiene-polyol having a functionality of 2.2 to 2.4 is reacted therein with a polyisocyanate in an NCO/OH ratio of 0.2 to 0.65 in order to form a polyol having a molar mass of 5000 to 30 000 and a functionality of 2.0 to 2.4. This polyol is subsequently mixed with a polyisocyanate in an NCO/OH ratio of 0.6 to 1.0 and reacted accordingly to form the desired product. In relation to use as a base elastomer of a thermally vulcanizable adhesive tape which is produced in a solvent-free compounding and coating operation, a product of this kind has the disadvantage either of being crosslinked and hence unsuitable for a coating operation, or, in the event that a very low NCO/OH ratio is operated within the limits specified in the patent, and so no crosslinking takes place, of being liquid at room temperature and therefore likewise unsuitable as a base elastomer for a coating operation.

Disclosed in U.S. Pat. No. 3,743,617A (Kest) are polyurethane pressure-sensitive adhesives based on the reaction product of diene polymers, carrying isocyanate-reactive groups, with isocyanate components in the presence of tackifier resins. A disadvantage here is the mandatory presence of tackifier resins, which may have disruptive consequences for the post-vulcanization adhesive properties of an adhesive tape produced from this product. Moreover, the patent is silent as to the issue of whether and, if so, how it is possible on this basis to produce a pressure-sensitively adhesive elastomer having a suitable melting or softening range for use in a solvent-free compounding and coating operation.

U.S. Pat. No. 3,515,773A (Continental), for the purpose of producing pressure-sensitive adhesives, proposes the reaction of hydroxylated polybutadienes with aromatic isocyanates and/or with precursors based on aromatic isocyanates, and at the same time emphasizes that tackiness can be achieved without the use of tackifier resins and plasticizers. A disadvantage is the use of aromatic isocyanates, in view of the possible particular health hazards posed by this class of substance. This patent as well is silent as to the issue of whether and, if so, how it is possible on this basis to produce a pressure-sensitively adhesive elastomer having a suitable melting or softening range for use in a solvent-free compounding and coating operation.

WO 1998030648 A1 (Shell) describes thermoplastic polyurethane pressure-sensitive adhesives based on hydrogenated polydiene-diols and -monools. These adhesives, in view of the objective of finding a pressure-sensitively adhesive, meltable base elastomer for a thermally vulcanizable adhesive tape, have the disadvantage that they cannot be vulcanized thermally.

It is an object of the invention to provide a preferably pressure-sensitive adhesive and also an adhesive tape comprising such an adhesive, each of which can be vulcanized thermally within a temperature range from 130° C. to 230° C., hence allowing them to be used in the automotive industry both in bodyshell construction on oiled metal panels and on the finishing line on CEC-coated or otherwise-painted metal panels, for adhesive bonding and/or sealing, as for example for hem flange bonding, for hem flange sealing, for seam sealing, for underseal bonding, for hole stopping, and much more. The bond strengths achievable with the adhesive are to be adjustable arbitrarily and in accordance with requirements, within wide limits. The range encompasses tensile shear strengths of between greater than 0 to at least 30.0 N/mm². The adhesive is to be able to be produced in a compounding and extrusion operation within a temperature range from 40° C. to 100° C. The base elastomer of this adhesive must therefore be in the form of a melt within this latter temperature range. During processing as a melt or during subsequent storage at temperatures up to 40° C., there must be no onset of the vulcanization reaction or any other crosslinking reaction. In the temperature range from room temperature (20° C.-25° C., ideally 23° C.) to 30° C., the adhesive must be sufficiently solid or of high viscosity that it can be wound to a roll, in the form of a film coated onto a release liner or in the form of a film coated onto a carrier material, without running out at the side or being squeezed out by the winding pressure.

This object is achieved by means of a thermally vulcanizable, meltable, preferably pressure-sensitive adhesive, comprising a meltable polybutadiene-polyurethane, ground sulphur and in each case optionally at least one vulcanization accelerator, at least one filler, at least one epoxy resin, at least one tackifier resin, bitumen, at least one plasticizer, and also further auxiliaries and additives.

Of the optional classes of substance—vulcanization accelerator, filler, epoxy resin, tackifier resin, bitumen, plasticizer, and also further auxiliaries and additives—it is possible in each case for there to be only one or for there to be any desired combination of two or more classes of substance included. Similarly, within each class of substance, there may be in each case one compound or any desired number of different compounds included.

The present invention relates in particular to a thermally vulcanizable adhesive which at room temperature has a solid or at least very highly viscous consistency and is preferably pressure-sensitively adhesive, can be processed as a melt in a compounding and extrusion operation in a temperature range between approximately 40° C. and 100° C., and can be vulcanized thermally in a temperature range between 130° C. and 230° C. and is therefore curable. The curing thus achieved includes a chemical crosslinking.

By thermal vulcanization in this text is meant exclusively the sulphur vulcanization, in other words the crosslinking of unsaturated compounds, by means of sulphur, that is activated and completed by temperature increase.

For activating the sulphur vulcanization it is possible to add vulcanization accelerators and vulcanizing auxiliaries and additives. These substances bring about a reduction in the activation temperature and/or accelerated curing and crosslinking.

A meltable polybutadiene-polyurethane for the purposes of this specification means a meltable reaction product which is prepared by a polyaddition reaction of at least one at least doubly hydroxyl-functionalized polybutadiene or polybutadiene derivative and at least one diisocyanate, and which at room temperature is sufficiently solid and dimensionally stable to allow it to be wound to a roll at room temperature, on a release liner or on a carrier material, without running out at the side or being squeezed out as a result of the winding pressure. At least doubly hydroxyl-functionalized polybutadiene derivatives are those compounds which are derived from polybutadiene-diols or polyols and which possess a plurality of C4 units, each containing a carbon/carbon double bond, and at the same time also carry other additional functional groups such as, for example, epoxide groups or additional side chains such as vinyl groups, for example, or other additional structural elements.

A meltable reaction product for the purposes of this specification has a complex viscosity of at least 3000 Pas, preferably at least 6000 Pas, ideally at least 10 000 Pas, as measured with a rheometer in an oscillation test under a sinusoidally oscillating shearing stress in a plate/plate arrangement, with a temperature of 23° C. and an oscillation frequency of 10.0 rad/s. At temperatures in the range between 40'C and 100° C. and with an oscillation frequency of 10.0 rad/s, the complex viscosity is reduced down to less than 1000 Pas, preferably down to less than 500 Pas, ideally down to less than 200 Pas. The oscillation frequency corresponds to the angular frequency.

The complex viscosity $\eta^*$ is defined as follows: $\eta^* = G^*/\omega$ ($G^*$=complex shear modulus, $\omega$=angular frequency).

The other definitions are as follows: $G^* = \sqrt{(G')^2 + (G'')^2}$ ($G''$=viscosity modulus (loss modulus), $G'$=elasticity modulus (storage modulus)).

$G'' = \tau/\gamma \cdot \sin(\delta)$ ($\tau$=shear stress, $\gamma$=deformation, $\delta$=phase angle=phase shift between shear stress vector and deformation vector).

$G' = \tau/\gamma \cdot \cos(\delta)$ ($\tau$=shear stress, $\gamma$=deformation, $\delta$=phase angle=phase shift between shear stress vector and deformation vector).

$\omega = 2\pi \cdot f$ (f=frequency).

Pressure-sensitive adhesiveness is that property of a substance which enables it to enter into a durable bond to a substrate even under relatively weak applied pressure. Substances possessing this quality are referred to as pressure-sensitive adhesives (PSAs). PSAs are long-established. Frequently they can be detached from the substrate again after use, substantially without residue. At room temperature, in general, PSAs have a permanent inherent adhesiveness, thus having a certain viscosity and tack, so that they wet the surface of the particular substrate even under low applied pressure. The capacity of a PSA to adhere to materials and to transmit forces derives from the adhesion capacity and the cohesion of the PSA.

PSAs may be viewed as liquids of extremely high viscosity with an elastic component. PSAs accordingly have particular, characteristic viscoelastic properties which result in the permanent inherent tack and adhesiveness.

A characteristic of PSAs is that when they are mechanically deformed, there are processes of viscous flow and there is also development of elastic forces of resilience. The two processes have a certain relationship to one another in terms of their respective proportion, in dependence not only on the precise composition, the structure and the degree of crosslinking of the respective PSA, but also on the rate and duration of the deformation and on the temperature.

The proportional viscous flow is necessary for the achievement of adhesion. Only the viscous components, brought about by macromolecules with relatively high mobility, permit effective wetting and flow onto the substrate where bonding is to take place. A high viscous flow component results in high tack (also referred to as surface stickiness) and hence often also to a high peel adhesion. Highly crosslinked systems, crystalline polymers, or polymers with glasslike solidification lack flowable components and are therefore in general devoid of pressure-sensitive adhesiveness or at least possess only little pressure-sensitive adhesiveness.

The proportional elastic forces of resilience are necessary for the attainment of cohesion. They are brought about, for example, by very long-chain macromolecules with a high degree of coiling, and also by physically or chemically crosslinked macromolecules, and they permit the transmission of the forces that act on an adhesive bond. As a result of these forces of resilience, an adhesive bond is able to withstand a long-term load acting on it, in the form of a long-term shearing load, for example, to a sufficient extent over a relatively long time period.

For more precise description and quantification of the extent of elastic and viscous components, and also of the proportion of the components relative to one another, the variables of storage modulus ($G'$) and loss modulus ($G''$) can be employed, and may be determined by means of Dynamic Mechanical Analysis (DMA). $G'$ is a measure of the elastic component, $G''$ a measure of the viscous component, of a substance. The two variables are dependent on the deformation frequency and on the temperature.

The variables can be determined with the aid of a rheometer. In that case, for example, the material under investigation, in the form of a plane-parallel layer, is exposed in a plate/plate arrangement to a sinusoidally oscillating shearing stress. In the case of instruments operating with shear stress control, the deformation is measured as a function of time, and the time offset of this deformation relative to the introduction of the shearing stress is recorded. This time offset is referred to as phase angle δ.

The storage modulus G' is defined as follows: $G'=(\tau/\gamma)*\cos(\delta)$ ($\tau$=shear stress, $\gamma$=deformation, $\delta$=phase angle—phase shift between shear stress vector and deformation vector). The definition of the loss modulus G" is as follows: $G''=(\tau/\gamma)*\sin(\delta)$ ($\tau$=shear stress, $\gamma$=deformation, $\delta$=phase angle—phase shift between shear stress vector and deformation vector).

A substance and the layer produced from it are deemed in general to be pressure-sensitively adhesive, and are defined as pressure-sensitively adhesive for the purposes of this specification, if at room temperature, here by definition at 23° C., in the deformation frequency range from $10^0$ to $10^1$ rad/sec, G' is located at least partly in the range from $10^3$ to $10^7$ Pa and if G" likewise is located at least partly within this range. Partly means that at least a section of the G' curve lies within the window formed by the deformation frequency range from $10^0$ (inclusive) up to $10^1$ (inclusive) rad/sec (abscissa) and also by the range of the G' values from $10^3$ (inclusive) to $10^7$ (inclusive) Pa (ordinate), and when at least a section of the G" curve is likewise located within this window.

Within this region, which in a matrix plot of G' and G" (G' plotted as a function of G"), may also be referred to as the viscoelastic window for PSA applications or as the PSA window according to viscoelastic criteria, there are in turn different sectors and quadrants which characterize more closely the PSA properties to be expected from the associated substances. Within this window, substances with high G" and low G' are notable, for example, in general for high peel adhesion and low shear strength, whereas substances with high G" and high G' are notable both for high peel adhesion and for high shear strength.

Generally, the knowledge about the relationships between rheology and pressure-sensitive adhesiveness is state of the art and is described for example in Satas, Handbook of Pressure Sensitive Adhesive Technology, Third Edition, (1999), pages 153 to 203.

Ground sulphur is soluble or insoluble, ground, elemental sulphur. The degree of purity ought to be at least 95%, more preferably at least 99%. The sulphur ought to be ground finely enough that the sieve residue for a mesh size of 100 μm is not more than 2%. Coarser grades do also operate in principle, but may result in the adhesive then possessing a roughness which can be distinctly perceived visually, and in somewhat lower attainable bond strengths.

Vulcanization accelerators which may be present optionally in the adhesive of the invention are understood in this specification to be all substances which are known to accelerate vulcanization. They may at the same time also be sulphur donors. The concept of the invention also embraces those known sulphur donors which in the technical literature are not explicitly also classified simultaneously as accelerators.

The most important vulcanization accelerators may be ordered in the following known classes of substance: mercapto accelerators, sulphenamide accelerators, sulphenimide accelerators, thiuram accelerators, dithiocarbamate accelerators, dithiocarbamylsulphenamide accelerators, xanthogenate accelerators, guanidine accelerators, amine accelerators, thiourea accelerators, dithiophosphate accelerators, and sulphur donors. Examples of mercapto accelerators are 2-mercaptobenzothiazole (MBT), zinc 2-mercaptobenzothiazole (ZMBT) and dibenzothiazyl disulphide (MBTS). Typical sulphenamide accelerators are N-cyclohexyl-2-benzothiazolesulphenamide (CBS), N-tert-butyl-2-benzothiazolesulphenamide (TBBS), N-oxydiethylene-2-benzothiazolesulphenamide (MBS) and N,N'-dicyclohexyl-2-benzothiazolesulphenamide (DCBS). An example of a sulphenimide accelerator is N-tert-butyl-2-benzothiazolesulphenimide. Examples of thiuram accelerators are tetramethylthiuram monosulphide (TMTM), tetramethylthiuram disulphide (TMTD), tetraethylthiuram disulphide (TETD), tetrabenzylthiuram disulphide (TBzTD), tetraisopropylthiuram disulphide (TiPTD), dimethyldiphenylthiuram disulphide (MPTD) and dipentamethylenethiuram tetrasulphide (TPTT). Zinc dimethyldithiocarbamate (ZDMC), zinc diethyldithiocarbamate (ZDEC), zinc dibutyldithiocarbamate (ZDBC), zinc pentamethylenedithiocarbamate (Z5MC), zinc ethylphenyldithiocarbamate (ZEPC), zinc dibenzyldithiocarbamate (ZBEC), zinc diisopropyldithiocarbamate (ZDIPC), piperidine pentamethylenedithiocarbamate (PPC), tellurium dimethyldithiocarbamate (TDMC), tellurium diethyldithiocarbamate (ZDEC), lead dimethyldithiocarbamate (PbDMC), copper dimethyldithiocarbamate (CuDMC), copper dibutyldithiocarbamate (CuDBC), bismuth dimethyldithiocarbamate (BiDMC) and sodium dimethyldithiocarbamate (NaDMC) represent a selection of known dithiocarbamate accelerators. Typical dithiocarbamylsulphenamide accelerators are N-oxydiethylenedithiocarbamyl-N'-oxydiethylenesulphenamide (OTOS) and N-oxydiethylenedithiocarbamyl-N'-tert-butylsulphenamide (OTTBS). Known examples of xanthogenated accelerators are zinc isopropylxanthogenate (ZIX), zinc butyixanthogenate (ZBX), sodium isopropylxanthogenate (NaIX) and polyxanthogenate. Typical guanidine accelerators are diphenylguanidine (DPG), di-o-tolylguanidine (DOTG) and o-tolyl biguanide (OTBG). Amine accelerators are, for example, butyraldehydeaniline (BAA), tricrotonylidenetetramine (TCT), hexamethylenetetramine (HEXA), polyethylenepolyamines (PEP) and cyclohexylethylamine (CEA). N,N'-ethylenethiourea (ETU), N,N'-dibutylthiourea (DBTU), N,N'-diethylthiourea (DETU) and N,N'-diphenylthiourea (DPTU) are examples of thiourea accelerators. Known dithiophosphate accelerators are zinc dibutyldithiophosphate (ZBPD), zinc diisooctyldithiophosphate (ZOPD), dodecylammonium diisooctyldithiophosphate (AOPD) and copper diisopropyldithiophosphate (CuPPD). Sulphur donors include 2-morpholinodithiobenzothiazole (MBSS), N,N'-dithiodimorpholine (DTDM) and caprolactam disulphide (CLD).

The knowledge about vulcanization accelerators, generally, is state of the art and is set out for example in Werner Hoffmann, Heinz Gupta, Handbuch der Kautschuk-Technologie (2001).

Preferred classes of substance are mercapto accelerators, thiuram accelerators and dithiocarbamate accelerators. Mercapto accelerators are regarded as "all-purpose" accelerators, which ensure rapid vulcanization and have no adverse effect on the stability of the as yet unvulcanized adhesive in the temperature range from 160° C. to 180° C. The thiuram accelerators and dithiocarbamate accelerators, individually or in combination, or else in combination with the mercapto accelerators, are regarded as "ultra-accelerators", which ensure rapid vulcanization even at temperatures from 130° C. upwards and which nevertheless ensure sufficient stability during the production of the adhesive, even in the case of compounding temperatures of up to around 90° C., and during subsequent storage at temperatures between room temperature and 30° C. A preferred "all-purpose" vulcanization accelerator is MBTS. Preferred "ultra-accelerators" are TBzTD and ZBEC. In addition to considerations of technical functionality, another factor in the selection is the safety aspect with regard to the possible release of hazardous, carcinogenic cleavage products, especially carcinogenic N-nitrosamines. In this regard, MBTS, TBzTD and ZBEC are considered not to be critical.

Preferred concentrations of the vulcanization accelerators in the thermally vulcanizable, meltable, preferably pressure-sensitive adhesive amount together to between at least 0.1 weight percent and not more than 15.0 weight percent, preferably between at least 0.5 and not more than 12.5 weight percent, more preferably between at least 1.0 and not more than 10.0 weight percent.

High concentrations of the vulcanization accelerators lower the curing temperature but raise the risk of onset of curing (vulcanization) during processing itself. Where the curing temperature of the adhesive is below 130° C., it is preferred, for compounding in an extruder, to use a planetary roller extruder as the compounding extruder, since this allows the compounding temperatures to be kept below 90° C., especially preferably below 80° C.

In order to accelerate the vulcanization further, it is also possible as required for vulcanization auxiliaries and additives to be added, such as, for example, metal oxides, especially zinc oxide, fatty acids, such as stearic acid, for example, or salts thereof. With regard to the stability of the as yet unvulcanized adhesive and with regard to the adhesion properties after vulcanization, particularly on oiled metal sheets, the use of vulcanization auxiliaries and additives has proved to be rather critical, and so preferred embodiments are free from these substances.

As fillers, which may likewise be included optionally, it is possible to use not only reinforcing fillers, such as carbon black, for example, but also non-reinforcing fillers, such as carbonates, for example, especially chalk, or sulphates such as barium sulphate, for example. Other examples of fillers that are contemplated are silicates, such as talc, kaolin, calcined or partly calcined kaolin, wollastonites or micas, hydroxides or oxides, such as finely ground quartz, for instance, aluminium hydroxide, zinc oxide or calcium oxide. Microspheres are also contemplated as fillers. Microspheres may be solid glass microspheres, hollow glass microspheres and/or polymeric microspheres of all kinds. The polymeric microspheres may be in unexpanded or pre-expanded form. The particle size in the expanded state is usually in the range between 20 and 150 µm. Mixtures of the substances stated may also be used. In particular, mixtures of calcium carbonate and calcium oxide have proved to be particularly advantageous in respect of the attainment of high bond strengths and in respect of the minimization of occasional blistering during the thermal vulcanization. Advantageous weight fractions of calcium carbonate and calcium oxide in the thermally vulcanizable, meltable, preferably pressure-sensitive adhesive amount together to between 10.0 and 70.0 percent by weight. Talc has also emerged as being advantageous, for the same reasons. Advantageous weight fractions of talc in the thermally vulcanizable, meltable, preferably pressure-sensitive adhesive amount to between 10.0 and 50.0 percent by weight.

The thermally vulcanizable, meltable, preferably pressure-sensitive adhesive may optionally comprise epoxy resins. The term "epoxy resin" here refers to synthetic resins which carry epoxide groups. Advantageous are bisphenol-based epoxy resins, especially those based on bisphenol A, but also those based on bisphenol F. Particularly advantageous is an epoxy resin which is liquid at room temperature, especially the reaction product of bisphenol A and epichlorohydrin that has a number-averaged, average molecular weight of less than or equal to 700 g/mol (CAS No. 25068-38-6), but also corresponding solid reaction products having higher number-averaged average molecular weights are optional epoxy resins. Other advantageous epoxy resins are epoxyphenol-novolac resins, epoxydicyclopentadiene-phenol-novolac resins, epoxycresol-novolac resins, glycidylamine-based epoxy resins, especially triglycidyl ethers of para-aminophenol, triglycidyl ethers of meta-aminophenol, tetraglycidyl ethers of methylenedianiline, hydroxyphenyl-based epoxy resins, and aliphatic epoxy resins, especially those which are cycloaliphatic. Particularly noteworthy here is 3,4-epoxycyclohexylmethyl 3',4'-epoxycyclohexanecarboxylate (CAS No. 2386-87-0).

An advantageous concentration of the epoxy resin in the thermally vulcanizable, meltable, preferably pressure-sensitive adhesive is between 1.0 wt % (inclusive) and 20 wt % (inclusive). Particularly advantageous is a concentration between 5.0 wt % (inclusive) and 15.0 wt % (inclusive). The addition of epoxy resins has emerged as being advantageous particularly in respect of the adhesion properties of the thermally vulcanizable, meltable, preferably pressure-sensitive adhesive on oiled metal sheets after the thermal vulcanization reaction. Moreover, the viscosity of the compounded formulation during the production of the adhesive is lowered advantageously, allowing operation to take place at lower process temperatures.

The chemical conversion to form the meltable polybutadiene-polyurethane advantageously takes place already in the presence of the optional at least one epoxy resin. The advantage of this process is that the at least one epoxy resin can be incorporated in an energy-saving manner, at room temperature. If, alternatively, the polybutadiene-polyurethane were to be prepared first, and then the at least one epoxy resin added, it would be necessary to heat the polybutadiene-polyurethane first of all to a temperature in which it was present as a melt. The disadvantage of that would be the need for a higher energy input. A further advantage is that the softening or melting temperature of the mixture of prepolymer and epoxy resin is significantly lower than the softening or melting temperature of the pure prepolymer, but with the hotmelt character still retained. Subsequent compounding with sulphur and other substances, such as vulcanization accelerators, for example, can therefore take place in an energy-saving manner, and gently, at lower temperatures than without the epoxy resin already incorporated during polybutadiene-polyurethane preparation. In this way, compounding with so-called ultra-accelerators, which occasionally cause onset of vulcanization even at approximately 120° C. within a few minutes, is possible without any unwanted instances of curing or gelling during the compounding operation. If the subsequent compounding of the polybutadiene-polyurethane with sulphur, vulcanization accelerators and vulcanization auxiliaries and additives takes place in a continuously operating mixing assembly, more particularly in a compounding extruder, a further advantage is that none of the generally limited range of metering ports in the compounding extruder would be blocked by the at least one epoxy resin.

The fact that it is technically possible for the isocyanate-based chemical conversion to give the polybutadiene-polyurethane to take place in the presence of one or more epoxy resins is surprising for the skilled person, since isocyanates are described in the technical literature as being reactive towards epoxides, as for example in Ullmann's Encyclopedia of Industrial Chemistry, 6th Edition, Vol. 12, page 271 (table) and in Encyclopedia of Polymer Science and Engineering, Vol. 6, page 345.

Surprisingly it has been found, moreover, that mixtures of epoxy resin and the polybutadiene-polyurethane hotmelt tend towards phase separation if the at least one epoxy resin is mixed in only after the preparation of the polybutadiene-polyurethane. If, on the other hand, the chemical conversion to give the polybutadiene-polyurethane takes place in the presence of the epoxy resin/epoxy resins, the resulting mixtures are in fact generally cloudy, depending on the mixing ratio, but do not separate, and have the advantage of vulcanizing (curing) homogeneously, thereby allowing higher strength and better adhesion to be achieved than when using an inhomogeneous mixture of polybutadiene-polyurethane and epoxy resin. Similarly, other substances as well, such as plasticizers, tackifier resins, bitumen or else fillers or rheological additives, for example, may be added even before or during the chemical conversion to give the polybutadiene-polyurethane.

The thermally vulcanizable, meltable, preferably pressure-sensitive adhesive may optionally also comprise tackifier resins. The term "tackifier resin" is understood by the skilled person to refer to a resin-based substance which increases the tack. Tackifier resins can be divided into natural resins and synthetic resins.

Typical natural resins are rosin-based resins and their derivatives. Rosins include, for example, natural rosin, polymerized rosin, partially hydrogenated rosin, fully hydrogenated rosin, esterified products of these types of rosin (such as glycerol esters, pentaerythritol esters, ethylene glycol esters and methyl esters) and rosin derivatives (such as disproportionation rosin, fumaric acid-modified rosin and lime-modified rosin).

Typical synthetic resins are polyterpene resins, although the raw materials here originate from natural sources; hydrocarbon resins and terpene-phenolic resins. These are polymers of low molecular weight. The weight-averaged average molecular weight is generally less than 25 000 g/mol.

Polyterpene resins are based on α-pinene and/or R-pinene and/or 8-limonene. They may be hydrogenated, non-hydrogenated or partially hydrogenated.

Raw materials for the majority of hydrocarbon resins are by-products obtained in the cracking of naphtha or gas-oil. Hydrocarbon resins may be classified according to whether they are based primarily on aromatic, aliphatic or diene monomers. Aromatic resins are often referred to as C-9 resins, aliphatic resins as C-5 resins, and diene resins as $(C-5)_2$ resins. Mixed aromatic-aliphatic hydrocarbon resins ((C-5/C-9) resins) are likewise included by the concept of the invention. Hydrocarbon resins as well may be hydrogenated, non-hydrogenated or partially hydrogenated.

Further included in the concept of the invention are monomer resins of the styrene/α-methylstyrene type (CAS No.: 9011-11-4). Terpene-phenolic resins, according to DIN 16916-1 1981-06 and ISO/TR 8244:1988, are resins produced by acid-catalysed addition reaction of phenols with terpenes or rosin.

Tackifier resins preferred in accordance with the invention are polyterpene resins based on α-pinene and/or β-pinene and/or δ-limonene. Especially preferred are β-pinene resins (CAS No.: 25719-60-2), an example being the resin Dercolyte S-115 from DRT.

Advantageous concentrations of the tackifier resins in the thermally vulcanizable, meltable, preferably pressure-sensitive adhesive are between 1.0 (inclusive) wt % and 30.0 (inclusive) wt %. Particularly advantageous are concentrations between 5.0 (inclusive) wt % and 20.0 (inclusive) wt %. The addition of tackifier resins has emerged as being advantageous particularly with regard to the adhesion properties of the thermally vulcanizable, meltable, preferably pressure-sensitive adhesive on oiled metal sheets prior to the thermal vulcanization reaction. The peel adhesion of the as yet unvulcanized adhesive on oiled metal sheets can be increased significantly in this way.

The thermally vulcanizable, meltable, preferably pressure-sensitive adhesive may optionally further comprise bitumen. Bitumen is a dark-coloured, high-molecular-mass hydrocarbon mixture which is semi-solid to springingly hard and which is obtained as a residue in the distillation of suitable petroleum, further containing chemically bonded sulphur, oxygen, nitrogen and certain traces of metals. In physical terms, bitumen is among the thermoplastics, meaning that its properties are temperature-dependent. On cooling, it becomes brittle; on heating, it passes steplessly through all of the states from solid via highly viscous to highly mobile. Distinctions are made between, among others, the following bitumen varieties and derived products: roadbuilding bitumen, especially soft bitumen, modified bitumen, especially polymer-modified bitumen, industrial bitumen, especially oxidation bitumen or hard bitumen, flux bitumen, and bitumen emulsion.

Preferred in accordance with the invention is roadbuilding bitumen. Particularly preferred is the 50/70 grade, the numbers indicating the minimum and maximum penetration at 25° C. in the units of mm/10 in accordance with DIN EN 1426. Advantageous concentrations of bitumen in the thermally vulcanizable, meltable, preferably pressure-sensitive adhesive are between 1.0 (inclusive) wt % and 30.0 (inclusive) wt %. Particularly advantageous are concentrations of between 5.0 (inclusive) wt % and 20.0 (inclusive) wt %. The addition of bitumen allows an improvement in the oil absorption when bonding takes place to oiled metal sheets.

The thermally vulcanizable, meltable, preferably pressure-sensitive adhesive may optionally further comprise plasticizers. Plasticizers are liquid or solid, inert organic substances of low vapour pressure, primarily of ester-like type, which interact physically with high-polymer substances, without chemical reaction, preferably by virtue of their solvency and swelling capacity, but in some cases even without such behaviour, and which are able to form a homogeneous system with said high-polymer substances. The abbreviated designations of plasticizers are regulated in DIN EN ISO 1043-3: 2000-01. The most important plasticizers can be divided into larger groups, which are listed below, with the abbreviated code of DIN EN ISO 1043-3: 2000-01 being given in parentheses.

Phthalic esters, also called phthalates for short, include, among others, dioctyl phthalate (DOP; di(2-ethylhexyl) phthalate), diisononyl phthalate (DINP), diisodecyl phthalate (DIDP), phthalic esters with predominantly linear $C_6$ to $C_{11}$ alcohols, dibutyl phthalate (DBP), diisobutyl phthalate (DIBP), dicyclohexyl phthalate (DCHP), dimethyl phthalate (DMP) and diethyl phthalate (DEP), and also mixed esters, comprising benzyl (butyl) phthalate (BBP), butyl octyl phthalate, butyl decyl phthalate and dipentyl phthalate, bis(2-methoxyethyl) phthalate and dicapryl phthalate (DCP).

An example of trimellitic esters with (predominantly) linear $C_6$ to $C_{11}$ alcohols is tris(2-ethylhexyl) trimellitate (TOTM).

Acyclic aliphatic dicarboxylic esters are, for example, esters of adipic acid such as bis(2-ethylhexyl) adipate (dioctyl adipate, DOA), bis(8-methylnonyl) adipate (diisodecyl adipate, DIDA), dibutyl decanedioate (dibutyl sebacate, DBS), bis(2-ethylhexyl) decanedioate (dioctyl sebacate, DOS). An example of a cyclic aliphatic dicarboxylic ester is diisononyl 1,2-cyclohexanedicarboxylate (DINCH).

Examples of polymer plasticizers are polyesters of adipic, decanedioic, nonanedioic and phthalic acid with diols such as butane-1,3-diol, propane-1,2-diol, butane-1,4-diol, hexane-1,6-diol and others ($M_r$ about 1800-13 000 g/mol).

Phosphoric esters, called phosphates for short, are a further group. Mention may be made here, by way of example, of tricresyl phosphate (TCF), triphenyl phosphate (TPP), diphenyl cresyl phosphate (DPCF), 2-ethylhexyl diphenyl phosphate (diphenyl octyl phosphate, DPOF), tris (2-ethylhexyl) phosphate (TOF) and tris(2-butoxyethyl) phosphate.

Butyl oleate or butyl stearate are examples of fatty acid esters, which represent a further group. Further examples of this group are methyl esters and butyl esters of acetylated ricinoleic fatty acid and fatty acid glycol esters and also triethylene glycol bis(2-ethylbutyrate).

Citric esters are examples of the group of hydroxycarboxylic esters. Further examples are tartaric esters and lactic esters.

A further group of plasticizers are epoxy plasticizers, as for example epoxidized fatty acid derivatives, especially triacyl glycerols and monoesters. Certain of the aforementioned epoxy resins as well may be classed within the group of the plasticizers. Mention may further be made of polyamide plasticizers, as for example benzenesulphonamides or methylbenzenesulphonamides. Another group of plasticizers are alkylsulphonic esters of phenyl (ASE). Mineral oils as well may be considered within the context of the present specification to be plasticizers. Naphthenic mineral oils are preferred. The bitumen as well, already listed separately, could be classed under the heading of the plasticizers.

In one optional embodiment, the thermally vulcanizable, meltable, preferably pressure-sensitive adhesive comprises further auxiliaries and additives such as, for example, rheological additives, ageing inhibitors (antioxidants), light stabilizers or UV absorbers. Examples of rheological additives are pyrogenic, hydrophobized or non-hydrophobized silicas, phyllosilicates (bentonites), high molecular mass polyamide powders or castor oil derivative powders. The stated rheological additives may also be classed under the heading of fillers. The suitable antioxidants include, for example, sterically hindered phenols, hydroquinone derivatives, amines, organic sulphur compounds or organic phosphorus compounds.

Light stabilizers employed are, for example, the compounds disclosed in Gaechter and Müller, Taschenbuch der Kunststoff-Additive, Munich 1979, in Kirk-Othmer (3rd) 23, 615 to 627, in Encycl. Polym. Sci. Technol. 14, 125 to 148 and in Ullmann (4.) 8, 21; 15, 529, 676.

In one advantageous embodiment, the meltable polybutadiene-polyurethane is a reaction product prepared by a polyaddition reaction of at least one polybutadiene-diol, at least one chain extender having a hydroxyl functionality of two and a molar mass of less than or equal to 300 g/mol and optionally at least one polybutadiene-polyol having a number-averaged average functionality of between greater than 2.0 and less than or equal to 3.0 with at least one aliphatic or alicyclic diisocyanate.

Chain extenders in the sense of this specification are all hydroxyl-bearing compounds having a hydroxyl functionality of two and a molar mass of less than or equal to 300 g/mol. They carry no further isocyanate-reactive groups. They are therefore diols having a molar mass of less than or equal to 300 g/mol. It is known that many chain extenders used in the preparation of polyurethanes based on polyester-polyols or polyether-polyols are not compatible with polybutadiene-diols and polyols. Separation occurs. Inventively preferred are the chain extenders that are compatible with polybutadiene-diols and polyols. These are, for example, N,N-diisopropanolaniline (CAS No. 003077-13-2), 2,2,4-trimethyl-1,3-pentanediol (CAS No. 144-19-4) and 2-butyl-2-ethyl-1,3-propanediol (CAS No. 115-84-4). Particularly preferred is 2-ethyl-1,3-hexanediol (CAS No. 94-96-2). The knowledge about the chain extenders that are compatible with polybutadiene-diols and polyols is part of the state of the art. It is published for example in Herbert Chao, Nan Tian, Cray Valley, USA, LLC, Exton, Pa., PCI, April 2010.

In order to achieve high pressure-sensitive adhesiveness (high tack) while at the same time avoiding excessive softness in the polybutadiene-polyurethane, which would lead to reduced shear strength, it is advantageous if the numerical proportion of the hydroxyl groups introduced for forming the polybutadiene-polyurethane that originate from the at least one chain extender is between greater than or equal to 20.0% and less than or equal to 80.0%, preferably between greater than or equal to 30.0% and less than or equal to 70.0%. The numerical fraction always corresponds to the amount-of-substance fraction.

A polybutadiene-diol in this specification refers to all hydroxyl-functionalized polybutadienes or derivatives thereof whose number-averaged average hydroxyl functionality is two or somewhat less than two, but at least 1.5, preferably at least 1.8. The number-averaged average hydroxyl functionality of a polybutadiene-diol is in no case greater than two.

A polybutadiene-polyol for the purposes of this specification refers to all hydroxyl-functionalized polybutadienes or derivatives thereof having a number-averaged average functionality of between greater than 2.0 and less than or equal to 3.0.

The number-averaged average hydroxyl functionality is understood to be the average number of hydroxyl groups per molecule of a polyol. In this specification it is expressed relative to the number-averaged average molecular weight of the polyol in question, and is calculated according to the following formula:

$$f = M_n \text{ [g/mol]} \times \text{OHN [mmol OH/kg]}/10^6$$

f is the number-averaged average hydroxyl functionality. $M_n$ is the number-averaged average molecular weight of the respective polyol in the units [g/mol] and OHN is the hydroxyl number of the polyol in the units [mmol OH/kg].

The hydroxyl number is a measure of the amount of hydroxyl groups in a polyol.

The hydroxyl number is determined here according to DIN 53240. According to this method, the hydroxyl number (OHN) is expressed in the units [mg KOH/g]. It corresponds to the amount of KOH in [mg] which is equivalent to the amount of acetic acid bound in the acetylation of 1 g of polyol. For simplification of the formula calculations, the hydroxyl number in this specification is converted to the units [mmol OH/kg].

This is done according to the following formula:

OHN [mmol OH/kg]=OHN [mg KOH/g]×1000/56.1.

56.1 here is the molar mass of KOH.

The bonding of the hydroxyl groups of the polybutadiene-diols and -polyols to the polybutadiene chain may be primary or secondary. The butadiene units of the polybutadiene chain may be linked with one another in a 1,4 cis or trans form or in a 1,2 form with vinyl groups in the side chain, or in a mixed way. Polybutadiene-diols are prepared by anionic polymerization, whereas polybutadiene-polyols having a number-averaged average functionality of between greater than 2.0 and less than or equal to 3.0 are prepared by radical polymerization. Polybutadiene-diols are available commercially under the tradename Krasol®; polybutadiene-polyols having a number-averaged average functionality of between greater than 2.0 and less than or equal to 3.0 are available commercially under the tradename Poly bd®, both products from the company Cray Valley.

To achieve a high pressure-sensitive adhesiveness (high tack) it is advantageous to use polybutadiene-diols having a number-averaged average molar mass of between greater than 1000 g/mol and less than 5000 g/mol, preferably between greater than or equal to 2000 g/mol and less than or equal to 3000 g/mol.

For the same reason, the optional polybutadiene-polyols having a number-averaged average functionality of between greater than 2.0 and less than or equal to 3.0 ought also to have a number-averaged average molar mass of between greater than 1000 g/mol and less than 5000 g/mol, preferably between greater than or equal to 2000 g/mol and less than or equal to 3000 g/mol.

The polybutadiene-polyols having a number-averaged average functionality of between greater than 2.0 and less than or equal to 3.0 may be used optionally for producing the polybutadiene-polyurethane, in order to incorporate branching sites into the polyurethane. A certain degree of branching would have the advantage of reduced softening on the part of the coated polyurethane during thermal vulcanization, in the course of the supplying of temperature but before the onset of the vulcanization reaction, and hence of a greater shear strength in this phase immediately prior to the curing brought about by the vulcanization.

If also using the optional polybutadiene-polyols having a number-averaged average functionality of between greater than 2.0 and less than or equal to 3.0 for producing the polybutadiene-polyurethane, it is necessary to ensure that no gelling occurs, in other words that the degree of branching in relation to the length of the prepolymer chains produced is not so high that there is crosslinking during the polyaddition reaction. A degree of branching is set such as to ensure the meltability of the polybutadiene-polyurethane, in other words such that no crosslinked structures are formed. In order to rule out crosslinked structures, it is mandatory not to exceed what is called the gel point. The theoretical gel point can be calculated using the gel point equation of P. J. Flory. A formula derived from the Flory equation and used for estimating the gelling NCO/OH ratio in reactions of polyurethane formation from diols and triols with diisocyanates in deficit reads as follows:

$$\left[\frac{NCO}{OH}\right]_{gelling} = \frac{1}{1 + \frac{1}{\frac{(diol\text{-}OH)}{(triol\text{-}OH)} + 1}}$$

Diol-OH in this formula refers to the total number of hydroxyl groups involved in the polyurethane formation reaction and originating from polyols whose hydroxyl functionality is less than or equal to two. This also includes the chain extenders. Triol-OH refers to the total number of hydroxyl groups involved in the polyurethane formation reaction and bonded to polyols whose functionality is greater than two and less than or equal to three.

If the gelling NCO/OH ratio is reached or exceeded, there is a likelihood that crosslinked structures will form, and therefore that gelling will ensue. The formula provides only an approximate starting point, but nevertheless one which is generally sufficient for practical purposes, for determining the NCO/OH ratio at which gelling actually occurs.

If operating with diisocyanates in excess, in other words if the NCO/OH ratio is greater than 1.0, the above formula should be applied reciprocally.

The numerical fraction of the hydroxyl groups introduced for forming the polybutadiene-polyurethane and originating from the optional at least one polybutadiene-polyol having a number-averaged average functionality of between greater than 2.0 and less than or equal to 3.0 is advantageously not more than 50.0%, preferably not more than 30.0%, more preferably not more than 10%. Higher fractions require a disadvantageously low NCO/OH ratio in the case of NCO deficit, or a disadvantageously high NCO/OH ratio in the case of NCO excess, which would result in an advantageously low softening temperature of the hydroxyl-functionalized polybutadiene-polyurethane hotmelt prepolymer. With regard to operational reliability, the fraction is especially advantageously 0.0%. At a fraction of 0.0%, the risk of premature formation of crosslinked structures, in other words the onset of gelling during polyurethane production, is the lowest.

The polybutadiene-polyurethane is obtained by reaction of the stated diols/polyols with at least one aliphatic or alicyclic diisocyanate.

Aliphatic or alicyclic diisocyanates are understood in this specification to be all organic polyisocyanates having an isocyanate functionality of two in which the isocyanate groups are not bonded directly to a ring system which is aromatic in accordance with Hückel's rule. Examples of aliphatic or alicyclic diisocyanates are butane 1,4-diisocyanate, tetramethoxybutane 1,4-diisocyanate, hexane 1,6-diisocyanate, ethylene diisocyanate, 2,2,4-trimethylhexamethylene diisocyanate, ethylethylene diisocyanate, dicyclohexylmethane 4,4'-diisocyanate (H12MDI), 1,4-diisocyanatocyclohexane, 1,3-diisocyanatocyclohexane, 1,2-diisocyanatocyclohexane, 1,3-diisocyanatocyclopentane, 1,2-diisocyanatocyclopentane, 1,2-diisocyanatocyclobutane, 1-isocyanatomethyl-3-isocyanato-1,5,5-trimethylcyclohexane (isophorone diisocyanate, IPDI), 1-methyl-2,4-diisocyanatocyclohexane, 1,6-diisocyanato-2,2,4-trimethylhexane, 1,6-diisocyanato-2,4,4-trimethylhexane, 5-isocyanato-1-(2-iso-cyanatoeth-1-yl)-1,3,3-trimethylcyclohexane, 5-isocyanato-1-(3-isocyanatoprop-1-yl)-1,3,3-trimethylcyclohexane, 5-isocyanato-1-(4-isocyanatobut-1-yl)-1,3,3-trimethylcyclohexane, 1-isocyanato-2-(3-isocyanatoprop-1-yl)-cyclohexane, 1-isocyanato-2-(2-isocyanatoeth-1-yl)-cyclohexane, 2-heptyl-3,4-bis(9- isocyanatononyl)-1-pentylcyclohexane, norbornane diisocyanatomethyl and also m-tetramethylxylene diisocyanate (TMXDI). Particularly preferred are isophorone diisocyanate (CAS No. 4098-71-9) and dicyclohexylmethane 4,4'-diisocyanate (CAS No. 5124-30-1).

In one advantageous embodiment, the ratio of the total number of isocyanate groups to the total number of hydroxyl groups in the substances involved in the chemical reaction to give the polybutadiene-polyurethane is between greater than or equal to 0.3 and less than or equal to 1.3, preferably between greater than or equal to 0.4 and less than or equal to 1.2, more preferably between greater than or equal to 0.5 and less than or equal to 1.1, especially preferably between greater than or equal to 0.6 and less than or equal to 1.0. The preferred ratios result in hotmelt polyurethanes having a particularly firm consistency at room temperature and at the same time a high adhesiveness (high tack).

The polybutadiene-polyurethane of the invention preferably comprises the chemical reaction product of exclusively one or more polybutadiene-diols, optionally one or more polybutadiene-polyols having a number-averaged average functionality of between greater than 2.0 and less than or equal to 3.0, and one or more chain extenders having a hydroxyl functionality of two and a molar mass of less than or equal to 300 g/mol with one or more aliphatic or alicyclic diisocyanates. Preferably, therefore, there are no additional, other polyols or isocyanates involved in the chemical reaction to give the polybutadiene-polyurethane, and more particularly no polyether-polyols, no polyester-polyols and no aromatic diisocyanates. It is assumed that when the polybutadiene-polyurethane of the invention is used as a base elastomer in the production of a thermally vulcanizable, meltable, preferably pressure-sensitive adhesive, polyether-polyols and polyester-polyols have disadvantageous consequences for the adhesion properties after the vulcanization reaction, especially for the adhesion properties on oiled metal sheets. It is further assumed that aromatic diisocyanates are disadvantageous for the adhesiveness (the tack).

To accelerate the reaction, the chemical conversion to form the polybutadiene-polyurethane takes place preferably with addition of a catalyst. It is possible to use one or more catalysts known to the skilled person, such as, for example, tertiary amines, organobismuth or organotin compounds, to name but a few. Very advantageously it is possible to use catalysts containing bismuth and carbon, preferably a bismuth carboxylate or a bismuth carboxylate derivative. Particularly advantageous is bismuth trisneodecanoate (CAS No. 34364-26-6).

The concentration of the catalysts is tailored to the desired reaction rate and is situated typically at between 0.01 wt % and 0.5 wt % of the polybutadiene-polyurethane to be prepared.

The polybutadiene-polyurethane of the invention is preferably prepared without the use of solvents. Including solvents in the production operation, while readily possible technically, does not normally bring any advantages.

The polybutadiene-polyurethane of the invention is advantageously produced batchwise, in other words discontinuously, for example in a heatable mixing vessel, kneading apparatus, planetary mixer or dissolver. In order to achieve absence of bubbles, mixing takes place in the end phase of the operation, when the chemical reaction is largely concluded, preferably under reduced pressure.

The present invention further relates to an adhesive tape coated on one side or on both sides at least partially with the pressure-sensitive adhesive of the invention. This adhesive tape may also be an adhesive transfer tape. An adhesive tape allows particularly simple and precise bonding and is therefore particularly suitable.

The general expression "adhesive tape" encompasses a carrier material which is provided on one or both sides, in each case at least partially, with a (pressure-sensitive) adhesive. The carrier material encompasses all sheet-like structures, examples being two-dimensionally extended films or film sections, tapes with extended length and limited width, tape sections, diecuts (in the form of edge surrounds or borders of an arrangement to be bonded, for example), other shapes, multi-layer arrangements and the like. For different applications it is possible to combine a very wide variety of different carriers, such as, for example, films, woven fabrics, nonwovens and papers, with the adhesives. Furthermore, the expression "adhesive tape" also encompasses what are called "adhesive transfer tapes", i.e. an adhesive tape without carrier. In the case of an adhesive transfer tape, the adhesive tape, prior to the application, is instead applied between flexible liners which are provided with a release coat and/or have anti-adhesive properties. For the application, generally, first one liner is removed, the adhesive is applied, and then the second liner is removed. The adhesive can thus be used directly to join two surfaces.

Also possible, however, are adhesive tapes which operate not with two liners, but instead with a single liner with double-sided release. In that case the web of adhesive tape is lined on its top face with one side of a double-sidedly releasing liner, while its bottom face is lined with the reverse side of the double-sidedly releasing liner, more particularly of an adjacent turn on a bale or roll.

For certain applications it may be desirable for one side or both sides of the adhesive tape not to be provided completely with adhesive, but instead for partially adhesive-free regions to be provided, in order to take account, for example, of cutouts in the surfaces to which bonding is to take place.

As the carrier material of an adhesive tape it is presently preferred to use polymer films, film composites, or films or film composites provided with organic and/or inorganic layers, preferably films, and more particularly dimensionally stable polymeric films or metal foils. Such films/film composites may consist of any common plastics used in film production, with examples—although without restriction—including the following:

Polyethylene, polypropylene—especially the oriented polypropylene (OPP) produced by monoaxial or biaxial stretching, cyclic olefin copolymers (COC), polyvinyl chloride (PVC), polyesters—especially polyethylene terephthalate (PET) and polyethylene naphthalate (PEN), ethylene-vinyl alcohol (EVOH), polyvinylidene chloride (PVDC), polyvinylidene fluoride (PVDF), polyacrylonitrile (PAN), polycarbonate (PC), polyamide (PA), polyethersulphone (PES) or polyimide (PI).

Polyester films have the advantage that they ensure temperature stability and provide enhanced mechanical stability. With very particular preference, therefore, a carrier layer in a liner of the invention consists of a polyester film, for example of biaxially oriented polyethylene terephthalate.

In the case of double-sidedly (self-)adhesive tapes, the adhesives used as the top and bottom layers may be identical or different adhesives of the invention, and/or the layer thicknesses thereof that are used may be the same or different. The carrier in this case may have been pretreated according to the prior art on one or both sides, with the achievement, for example, of an improvement in adhesive anchorage. The layers of PSA may optionally be lined with release papers or release films. Alternatively it is also possible for only one layer of adhesive to be lined with a double-sidedly releasing liner.

In one variant, an adhesive of the invention is provided in the double-sidedly (self-)adhesive tape, and also any desired further adhesive is provided, for example one which adheres particularly well to a masking substrate or exhibits particularly good repositionability.

The thickness of the layer of PSA, present either in the form of an adhesive transfer tape or coated on a sheet-like structure, is preferably between 10 µm and 5000 µm, more preferably between 100 µm and 4000 µm and very preferably between about 200 µm and 3000 µm.

For double-sided adhesive tapes it is likewise the case for the adhesives that the thickness of the individual layer or layers of PSA is preferably between 10 µm and 5000 µm, more preferably between 100 µm and 4000 µm and very preferably between about 200 µm and 3000 µm.

Adhesive tapes coated on one or both sides with adhesives usually end their production process by being wound up to form a roll in the form of an archimedean spiral or in cross-wound form. To prevent the adhesives making contact with one another in the case of double-sided adhesive tapes, or to prevent the adhesives sticking to the carrier in the case of single-sided adhesive tapes, the adhesive tapes prior to winding are lined with a covering material (also referred to as release material) which is wound up together with the adhesive tape. The skilled person knows such covering materials under the names of liners or release liners. In addition to the covering of single-sided or double-sided adhesive tapes, liners are also used for the lining of pure adhesives (adhesive transfer tape) and adhesive-tape sections (labels for example).

The thermally vulcanizable, meltable, preferably pressure-sensitive adhesive of the present invention is used preferably as a layer for producing a thermally vulcanizable, preferably pressure-sensitive adhesive tape or sealing tape, and also shaped articles or diecuts produced therefrom, and the thermally vulcanizable, meltable, preferably pressure-sensitive adhesive tape or sealing tape here may comprise additionally pressure-sensitive adhesive and/or non-pressure-sensitive adhesive layers, carrier films or foils, adhesion-promoting layers, release layers or other functional layers, and also a plurality of adhesive-tape layers which can be vulcanized thermally or can be otherwise cured or crosslinked, and it may have been finished with a release liner, which may have siliconization on one or both sides.

A thermally vulcanizable, meltable, preferably pressure-sensitive adhesive tape layer is produced preferably in a solvent-free, continuous compounding and coating operation. The metered addition of the sulphur and of the optional vulcanization accelerators, fillers and also the further auxiliaries and additives to the polybutadiene—polyurethane—optionally already comprising epoxy resins and/or other further components—takes place preferably into the continuously operating mixing assembly, more particularly the compounding extruder, during the continuous compounding operation.

The thermally vulcanizable, meltable, preferably pressure-sensitive adhesive of the invention and also pressure-sensitive adhesive tapes produced from it exhibit an outstanding combination of product properties of a kind which could not have been predicted even by the skilled person.

The adhesive of the invention can be adjusted specifically in such a way as to cure within a short time within the temperature range between 130° C. and 230° C. A short time means between approximately 5 and 30 minutes, depending on whether an accelerator system, and which accelerator system, has been used. It is adjustable here in such a way that good adhesion to the substrate to which the adhesive has been applied is built up in the course of curing, so that there is cohesive fracture within the layer of adhesive when attempts are made to remove the layer of adhesive from the substrate in, for example, a tensile shear test in accordance with DIN EN 1465 or in a peel test. The bond strengths obtainable are adjustable as per requirements within a wide range. In the tensile shear test, for example, they cover the range from greater than 0 to at least 30 N/mm². The bond strength is controlled here primarily via the fraction of sulphur in relation to the polybutadiene-polyurethane. Further control possibilities arise from the optional formulating possibilities.

The abovementioned substrates to which the adhesive or the adhesive tape is applied may typically be oiled steel sheets of the kind used in body construction in the automotive industry. They may be galvanized or non-galvanized. Other kinds of metal as well, such as aluminium, for example, are suitable. Alternatively, the substrates may be painted or precoated metal sheets, such as cataphoretically dip-coated metal sheets (CEC sheets), for example, of the kind present on the finishing lines of the automotive industry.

Because the adhesive of the invention adheres well to the typical substrates of automotive body construction and of the finishing line, and because the bond strengths can be adjusted as per requirements within a wide range, the adhesive of the invention and the adhesive tape of the invention can be used not only for adhesive bonding but also for sealing, as for example for hem flange bonding, for hem flange sealing, for seam sealing, for underseal bonding, for hole stopping, and much more.

The adhesive of the invention can be adjusted specifically in a variety of ways to provide it with pressure-sensitive tack. This may be done, for example, by the NCO/OH ratio or via the chain extender fraction, or via the fraction of a tackifier resin, to name just a few possibilities.

An adhesive tape layer composed of the thermally vulcanizable, meltable, preferably pressure-sensitive adhesive of the invention may be produced in a solvent-free, continuous or else batchwise compounding and extruding operation without any curing within such a hotmelt production procedure. The operating temperatures range here between approximately 40° C. and 100° C., depending on the viscosity of the adhesive of the invention. An operation of this kind is possible within the stated temperature bounds even when using optional vulcanization accelerators. When the optional ultra-accelerators are used, the maximum possible operating temperature is approximately 80° C. to 90° C. As a result of the possibility of producing the adhesive tape layer from the adhesive of the invention in a hotmelt operation, it is possible advantageously to produce very thick layers, several millimetres thick, for example, without any disruptive blistering. Since the adhesive of the invention goes through a highly viscous liquid state for a short time prior to curing, it is possible to achieve gap-filling properties.

At room temperature up to approximately 30° C., the adhesive of the invention is sufficiently solid or of high viscosity to allow it to be wound to a roll in the form of a film coated onto a release liner or onto a carrier material, without running out at the side or being squeezed out as a result of the winding pressure.

The adhesive, or an adhesive tape produced from it, proves to have very great stability on storage in the temperature range from room temperature up to approximately 40° C. It does not require cooled storage, which is a great advantage. The storage stability extends to a period of at least a year.

Optional epoxy resins may bring particular advantages. By adding one or more epoxy resins it is possible to achieve an improvement in the adhesive properties, particularly on some kinds of oiled metal sheet, after the thermal vulcanization reaction.

Through the optional addition of bitumen it is possible to improve the oil absorption, giving cohesive fracture modes in the tensile shear test even in the case of bonds with highly oil metal sheets.

The optional addition of tackifier resins has emerged as being advantageous particularly with regard to the adhesion properties of the thermally vulcanizable, meltable, preferably pressure-sensitive adhesive on oiled metal sheets before the thermal vulcanization reaction. The peel adhesion of the as yet unvulcanized adhesive on oiled metal sheets can be increased significantly in this way. This is of particular advantage for the addition of β-pinene resins.

Fillers are able, surprisingly, to make a positive contribution to increasing the bond strength. Mixtures of calcium carbonate and calcium oxide, in particular, have proved to be particularly advantageous in achieving high bond strengths and minimizing occasional blistering during the thermal vulcanization. In this way it has been possible to boost significantly the tensile shear strengths without any change in sulphur concentration. Talc as well has emerged as being advantageous in this regard.

The following examples are intended to provide more detailed description of the invention, without wishing thereby to restrict the invention.

The test methods below were used in order to characterize briefly the specimens produced in accordance with the invention:

Dynamic Mechanical Analysis (DMA) for Determining the Storage Modulus G' and the Loss Modulus G"

To characterize the meltable polybutadiene-polyurethanes, determinations were made of the storage modulus G' and the loss modulus G" by means of Dynamic Mechanical Analysis (DMA).

The measurements took place using the shear rate-controlled rheometer DSR 200 N from Rheometric Scientific in an oscillation test with a sinusoidally oscillating shearing load in a plate/plate arrangement. The storage modulus G' and the loss modulus G" were determined in a frequency sweep from $10^{-1}$ to $10^2$ rad/sec at a temperature of 25° C. G' and G" are defined as follows:

G'=τ/γ·cos(δ) (τ=shear stress, γ=deformation, δ=phase angle=phase shift between shear stress vector and deformation vector).

G"=τ/γ·sin(δ) (τ=shear stress, γ=deformation, δ=phase angle=phase shift between shear stress vector and deformation vector).

The definition of the angular frequency is: ω=2π·f (f=frequency. The units are rad/sec.

The thickness of the samples measured was always between 0.9 and 1.1 mm (1±0.1 mm). The sample diameter was 25 mm in each case. Pre-tensioning was carried out with a load of 3 N. The stress of the sample bodies for all the measurements was 2500 Pa.

Dynamic Mechanical Analysis (DMA) for Determining the Complex Viscosity (η*)

To characterize the meltable polybutadiene-polyurethanes, determinations were made also of the complex viscosity by means of Dynamic Mechanical Analysis (DMA).

The measurements took place using the shear rate-controlled rheometer DSR 200 N from Rheometric Scientific in an oscillation test with a sinusoidally oscillating shearing load in a plate/plate arrangement. The complex viscosity was determined in a temperature sweep from –50° C. to +250° C. at an oscillation frequency of 10 rad/s. The complex viscosity η* is defined as follows: η*=G*/ω

(G*=complex shear modulus, ω=angular frequency).

The following definitions are as follows: $G^* = \sqrt{(G')^2 + (G'')^2}$ (G"=viscosity modulus (loss modulus), G'=elasticity modulus (storage modulus)).

G"=τ/γ·sin(δ) (τ=shear stress, γ=deformation, δ=phase angle=phase shift between shear stress vector and deformation vector).

G'=τ/γ·cos(δ) (τ=shear stress, γ=deformation, δ=phase angle=phase shift between shear stress vector and deformation vector).

ω=2π·f (f=frequency).

The thickness of the samples measured was always between 0.9 and 1.1 mm (1±0.1 mm). The sample diameter was 25 mm in each case. Pre-tensioning was carried out with a load of 3 N. The stress of the sample bodies for all the measurements was 2500 Pa.

Tack

The tack measurement (measurement of the surface stickiness) was carried out in accordance with the die measurement method based on ASTM D 2979-01 using the Texture Analyser TA 2 from SMS (Stable Micro Systems) at room temperature. According to this method, a cylindrical steel die is pressed with a defined pressing force and velocity onto the sample to be analysed, and after a defined time is withdrawn again at a defined velocity. The test result is the maximum force required for withdrawal, reported in the units N.

The test parameters in detail were as follows:
Cylinder radius: 1 mm cylinder area: 3.14 mm$^2$
Pressing velocity: 0.1 mm/s
Pressing force: 5 N
Pressing time: 0.01 s
Withdrawal velocity: 0.6 mm/s The thickness of the samples measured was always between 0.9 and 1.1 mm (1±0.1 mm). The measurement always took place prior to thermal vulcanization of the samples.

Dynamic Shear Test (Tensile Shear Strength).

The dynamic shear test took place on the basis of DIN EN 1465. It always took place after the thermal vulcanization of the bonded samples. For this purpose, rectangular diecuts with dimensions of 25.0 mm×12.5 mm were punched from a layer of adhesive tape composed of the adhesive of the invention, lined on both sides with a release paper in each case. The release papers were subsequently removed in each case from one side of a diecut. The thickness of the diecuts was always between 0.4 and 0.6 mm (0.5±0.1 mm).

The diecuts were placed congruently in each case onto the end of a test specimen (substrate) with dimensions of 100.0 mm×25.0 mm×2.0 mm. The diecuts now adhered in each case to this test specimen. Test specimens of steel, electrogalvanized steel, hot-dip-galvanized steel and cataphoretically electrocoated steel (CEC steel) were used. The designations of the uncoated steel test specimens were as follows:

Steel: DC04
Electrogalvanized steel: DC01ZE 25/25
Hot-dip-galvanized steel: DX51 D+Z275

The supplier of all of the stated test specimens was Rocholl GmbH.

Before the diecuts were applied, the uncoated test specimens were partly oiled (see table). The designation of the oil was Anticorit RP 4107 S (from Fuchs) and it was applied in a thickness of 2 to 3 g/m². Thereafter the release paper still remaining on the diecuts was removed.

Next, test specimens of the same material in each case were placed in each case flush with one end in such a way as to result in each case in an overlapping assembly as described in DIN EN 1465. The length of overlap was 12.5 mm in each case. The area of overlap was 300 mm² in each case. The overlapping assemblies were placed onto a metal sheet, with shims ensuring that the upper test specimen was unable to tip. A weight of 2 kg was placed on the upper test specimen in the region of the overlap area in each case. The assembly was subjected to the pressure of the weight for 10 seconds in each case at room temperature (pressing time). The weight was then removed. The assembly was subsequently vulcanized for 10 to 30 minutes in the temperature range between 130° C. to 230° C. In the course of this operation there was a curing reaction within the adhesive tape layer samples, and there was a developing strong adhesion between the respective adhesive tape layer samples and the respective test specimens. Adhesive bonding therefore took place, with a considerable increase in strength. The tensile shear strength was determined after cooling and after a waiting time of two to three hours.

Determining the tensile shear strength of overlap bonds allows statements to be made about the extent to which a double-sidedly adhesive product can be subject to shearing load. The determination was made in accordance with DIN EN 1465 by means of a tensile testing machine. The test velocity was 10 mm/min. All measurements were carried out in a conditioned chamber at 23° C. and 50% relative humidity.

Peel Adhesion

The peel adhesion was determined according to PSTC-101. The measurement always took place before the thermal vulcanization of the samples, and only on a few selected samples. In accordance with this method, the adhesive tape layer strip of the invention for measurement, comprising the adhesive of the invention, was applied to the substrate, lined with a polyester film 25 μm thick and thereby reinforced on its reverse, then pressed with a 2 kg weight twice, and immediately thereafter peeled off under defined conditions by means of a tensile testing machine. In a second measurement, the adhesive tape layer strip was peeled off only after 30 minutes. The peel angle was always 180°, the peel velocity 300 mm/min. The force required for peel removal is the peel adhesion, and is reported in the units N/cm. The substrate was always steel (DC04) which had been oiled with Anticorit RP 4107 S (from Fuchs) in a thickness of 2 to 3 g/m². The thickness of the adhesive tape layer strips was 0.2-0.3 mm.

Curing Temperature

The curing temperature of reactive adhesives is determined calorimetrically by way of Differential Scanning calorimetry (DSC) according to DIN EN ISO 11357-3:2013-04. Heating curves run with a heating rate of 10 K/min. The specimens are measured in Al crucibles with perforated lid and nitrogen atmosphere. A chemical reaction is detectable as an exothermic peak in the thermogram. The activation temperature recorded is the temperature at which the highest exotherm occurs (peak temperature).

Implementation of the Experiments

The meltable polybutadiene-polyurethanes were manufactured in laboratory batches in a heatable and evacuatable 1 litre planetary mixer from PC-Laborsystem. They were produced in each case by first weighing out the polybutadiene-polyols into the mixing canisters and carrying out mixing under reduced pressure at a temperature of 80° C. for two hours, accompanied by degassing, with residual moisture being removed accordingly. The chain extender was then added and was incorporated by mixing for 20 minutes without reduced pressure. Thereafter the remaining substances, such as, for example, the catalyst and/or the epoxy resin and/or the tackifier resin and/or the plasticizer and/or the bitumen, were added in accordance with the proportions indicated in the individual examples, and incorporated by mixing for 20 minutes. The final addition was that of the at least one aliphatic or alicyclic diisocyanate, which was incorporated homogeneously by mixing for 30 minutes at a temperature of approximately 80° C. The mixing canister was removed from the mixer and given an airtight closure, and the chemically reacting mixture was left to stand in this vessel at 23° C. for 7 days for the purpose of completing the reaction. To produce the thermally vulcanizable, meltable adhesive of the invention and to produce the adhesive tape layer of the invention produced from this adhesive, the one-week storage time was followed by the admixing of the further substances, such as, in particular, the ground sulphur, optionally the vulcanization accelerators, fillers, and also the further auxiliaries and additives to the meltable polybutadiene-polyurethane thus produced, these additions taking place at 40° C. to 100° C. in the same apparatus. For homogeneous incorporation of the substances, they were mixed in for approximately 30 minutes. Lastly, reduced pressure was applied for around 10 minutes in order to remove moisture and air incorporated by stirring. Thereafter, the mixtures were used to produce films in the desired thickness, by pressing of the mixtures between two glass plates, lined with siliconized polyester films, at around 80° C. After having been shaped in this way, the films were cooled to room temperature, causing them to solidify immediately.

Some of the polybutadiene-polyurethanes were alternatively fabricated in a conventional heatable and evacuatable 200 litre mixing vessel with dissolver-stirrer from Molteni. They were each produced by first weighing out the polybutadiene-polyols and mixing them under reduced pressure at a temperature of 80° C. for two hours. Then the chain extender was added and was incorporated by mixing without reduced pressure for 20 minutes. This was followed by addition of the remaining substances, such as, for example, catalyst and/or epoxy resin and/or tackifier resin and/or plasticizer and/or bitumen, in accordance with the proportions indicated in the individual examples, which were mixed in for 20 minutes. The final addition was that of the at least one aliphatic or alicyclic diisocyanate, which was mixed in homogeneously for 30 minutes. The chemically reacting mixtures were run off into a 200-litre drum, which was given an airtight closure and left to stand at 23° C. for 7 days for the mixtures to react to completion.

For the production of the adhesive tape layer of the invention, the polybutadiene-polyurethanes thus prepared were pumped by means of a drum melt pump at 40° C.-100° C. into a twin-screw extruder from Krauss Maffei Berstorff with the extruder designation ZE30Rx54D UTXmi (screw diameter 30 mm, L/D=54). The extruder was heated electrically from the outside to about 40° C. to 100° C. and was air-cooled with a variety of fans. It was designed so as to ensure effective commixing of polybutadiene-polyurethane and the further substances, such as, in particular, the ground sulphur, optionally the vulcanization accelerators, fillers, and also the further auxiliaries and additives, in the extruder within a short residence time. For this purpose, the mixing screws of the twin-screw extruder were arranged in such a way that conveying elements alternated with mixing elements. The further substances were added with suitable metering equipment, using metering aids, into the unpressurized conveying zones of the twin-screw extruder.

After the emergence (exit: circular die 5 mm in diameter) from the twin-screw extruder of the mixture, which was at a temperature of around 40° C. to 100° C., it was shaped to form a film, unless otherwise described, directly by means of a downstream two-roll applicator, between two incoming, double-sidedly siliconized polyester films 50 µm thick. The feed rate was varied between 1 m/min and 20 m/min. One of the incoming, double-sidedly siliconized polyester films was removed again immediately after the film had cooled and therefore solidified. The present film was subsequently wound up onto a cylindrical core. This film is the adhesive tape layer of the invention.

Table 1 lists the base materials (raw materials) used in the production of the polybutadiene-polyurethane, in each case with tradename, manufacturer and the technical data relevant to this invention.

Table 2 lists the base materials (raw materials) used additionally for the adhesives and adhesive tape layers of the invention produced from the polybutadiene-polyurethane. The stated raw materials are all freely available commercially.

TABLE 1

Base material (raw materials) used in producing the polybutadiene-polyurethane and in producing the comparative examples.

| Tradename | Description | Average number-averaged molar mass $M_n$ (g/mol) | OH or NCO number (mmol OH/kg or mmol NCO/kg) | Average, number-averaged functionality f | Manufacturer/Supplier |
|---|---|---|---|---|---|
| Polybutadiene-polyols | | | | | |
| Krasol LBH 2000 ® | Polybutadiene-diol | 2100 | 910 | 1.9 | Cray Valley |
| Poly bd R-45 HTLO ® | Polybutadiene-polyol, f greater than 2 | 2800 | 840 | 2.4 | Cray Valley |
| Polyether-polyols | | | | | |
| Voranol P 2000L ® | Polypropylene glycol, diol | 2000 | 989 | 2.0 | Dow |
| Chain extender | | | | | |
| 2-Ethyl-1,3-hexanediol (EHD) | CAS No.: 94-96-2, diol | 146.2 | 13679.8 | 2.0 | Sigma-Aldrich |
| Diisocyanates | | | | | |
| Vestanat IPDI ® | Isophorone diisocyanate (IPDI), CAS No.: 4098-71-9 | 222.3 | 8998 | 2.0 | Degussa |
| Desmodur W ® | Dicyclohexyl methane diisocyanate (HMDI), CAS No.: 5124-30-1 | 262 | 7571 | 2.0 | Bayer |
| 4,4'-Methylene-bis-(phenyl isocyanate) | MDI, CAS No.: 101-68-8 | 250.25 | 7992 | 2.0 | Sigma-Aldrich |
| Catalyst | | | | | |
| Coscat 83 ® | Bismuth trisneodecanoate CAS No.: 34364-26-6 | | | | Caschem |
| Epoxy resins | | | | | |
| Epikote 828 ® | Reaction product of bisphenol A and epichlorhydrin CAS No.: 25068-38-6 | | | | Brenntag |
| 3,4-Epoxycyclohexylmethyl 3',4'-epoxycyclohexane-carboxylate | CAS No.: 2386-87-0 | | | | Sigma-Aldrich |
| Plasticizer | | | | | |
| Gravex 925 ® | Naphthenic fabrication oil | | | | Shell |
| Bitumen | | | | | |
| Azalt 50/70 DE ® | Roadbuilding bitumen to DIN EN 12591, Table 1, softening point: 46-54° C. | | | | Total |

TABLE 2

Base materials (raw materials) used in producing the adhesives and adhesive
tape layers of the invention from the polybutadiene-polyurethanes

| Tradename | Description | Manufacturer/Supplier |
|---|---|---|
| Vulcanization substances and accelerators | | |
| Ground sulphur 80/90° | Soluble ground sulphur, CAS No.: 7704-34-9 | Avokal GmbH |
| MBTS | Di(benzothiazyl) disulphide, CAS No.: 120-78-5 | Weber & Schaer GmbH |
| ZBEC | Zinc bis(dibenzyldithiocarbamate), CAS No.: 14726-36-4 | Weber & Schaer GmbH |
| TBzTD | Tetrabenzylthiuram disulphide, CAS No.: 10591-85-2 | Weber & Schaer GmbH |
| Carbon blacks | | |
| Luvomaxx N 220 ® | Bead black | Lehmann & Voss |
| Printex 60 ® | Furnace black, Oil absorption No: 118, BET surface area: 115 | Orion Engineered Carbons GmbH |
| Fillers | | |
| Talc Pharma M ® | Talc, CAS No.: 14807-96-6, spec. surface area: 4.6 m$^2$/g | Scheruhn GmbH |
| Omyacarb 5-GU ® | Ground chalk, average particle diameter: 5.5 μm | Omya |
| Rapidquell ® Quicklime CL 90-Q | Calcium oxide, sieving residue >90 μm: 3 mass % | Rheinkalk GmbH |
| Tackifier resins | | |
| Dercolyte S115 ® | Beta-pinene resin | DRT |
| Wingtack ® 10 | C-5 resin | Cray Valley |

EXAMPLES

Inventive Example 1

The composition of the polybutadiene-polyurethane (PBD-PU 1) is as follows:

Composition PBD-PU 1:

| Raw material | Weight fraction [wt %] | Number of OH or NCO groups introduced, based on percentage weight fraction | Percentage ratio of number of OH groups to one another |
|---|---|---|---|
| Krasol LBH 2000 ® | 77.11 | 70.17 mmol OH | 50 |
| 2-Ethyl-1,3-hexanediol | 5.13 | 70.17 mmol OH | 50 |
| Coscat 83 ® | 0.15 | | |
| Desmodur W ® | 17.61 | 133.32 mmol NCO | |
| Total | 100.00 | | |

Production took place in a laboratory batch (1 litre). The weight fraction of Desmodur W® is calculated so that the NCO/OH ratio of the polyurethane is 0.95. The theoretical gel point is computed to be 1.0.

PBD-PU 1 at room temperature is solid, meltable and, in terms of consistency, rubber-like and tacky. The test results are summarized in the table below.

Test Results PBD-PU 1:

| | |
|---|---|
| G' (at 1 rad/sec and 23° C.) | 200 000 Pa |
| G" (at 1 rad/sec and 23° C.) | 150 000 Pa |
| G' (at 10 rad/sec and 23° C.) | 400 000 Pa |
| G" (at 10 rad/sec and 23° C.) | 230 000 Pa |
| Complex viscosity η* at 10 rad/sec and 23° C. | 46 000 Pas |
| Complex viscosity η* at 10 rad/sec and 90° C. | 600 Pas |

Production of the Inventive Adhesive and the Inventive Adhesive Tape Layer:

For producing the inventive adhesive and the inventive adhesive tape layer, PBD-PU 1 was blended further in a laboratory batch in accordance with the formula below, and shaped to form a film.

Composition of the Thermally Vulcanizable Adhesive Tape Layer Based on PBD-PU 1:

| Raw material | Weight percent |
|---|---|
| PBD-PU 1 | 90.0 |
| Ground sulphur 80/90° | 10.0 |

The results achieved were as follows:
Tack at 23° C.: 0.2 N
Tensile Shear Strength:

| Test specimen | Oil application | Curing | Tensile shear strength [MPa] | Fracture mode |
|---|---|---|---|---|
| Steel/steel | no | 30 min/200° C. | 5.9 | cohesive |
| Steel/steel | yes | 30 min/200° C. | 5.6 | cohesive |
| Electrogalvanized steel/electro-galvanized steel | yes | 30 min/200° C. | 4.8 | partially cohesive/partially adhesive |

-continued

| Test specimen | Oil application | Curing | Tensile shear strength [MPa] | Fracture mode |
|---|---|---|---|---|
| Hot dip galvanized steel/ hot dip galvanized steel | yes | 30 min/200° C. | 5.1 | partially cohesive/ partially adhesive |

Inventive Example 2

The composition of the polybutadiene-polyurethane (PBD-PU 2) is as follows:

Composition PBD-PU 2:

| Raw material | Weight fraction [wt %] | Number of OH or NCO groups introduced, based on percentage weight fraction | Percentage ratio of number of OH groups to one another |
|---|---|---|---|
| Krasol LBH 2000 ® | 75.02 | 68.27 mmol OH | 50 |
| 2-Ethyl-1,3-hexanediol | 4.99 | 68.27 mmol OH | 50 |
| Coscat 83 ® | 0.15 | | |
| Desmodur W ® | 19.84 | 150.19 mmol NCO | |
| Total | 100.00 | | |

Production took place in a laboratory batch (1 litre). The weight fraction of Desmodur W® is calculated so that the NCO/OH ratio of the polyurethane is 1.10. The theoretical gel point is computed to be 1.0.

PBD-PU 1 at room temperature is solid, meltable and, in terms of consistency, rubber-like and tacky. The test results are summarized in the table below.

Test Results PBD-PU 2:

| | |
|---|---|
| G' (at 1 rad/sec and 23° C.) | 150 000 Pa |
| G'' (at 1 rad/sec and 23° C.) | 120 000 Pa |
| G' (at 10 rad/sec and 23° C.) | 340 000 Pa |
| G'' (at 10 rad/sec and 23° C.) | 230 000 Pa |
| Complex viscosity $\eta^*$ at 10 rad/sec and 23° C. | 41 000 Pas |
| Complex viscosity $\eta^*$ at 10 rad/sec and 90° C. | 540 Pas |

Production of the Inventive Adhesive and the Inventive Adhesive Tape Layer:

For producing the inventive adhesive and the inventive adhesive tape layer, PBD-PU 2 was blended further in a laboratory batch in accordance with the formula below, and shaped to form a film.

Composition of the Thermally Vulcanizable Adhesive Tape Layer Based on PBD-PU 2:

| Raw material | Weight percent |
|---|---|
| PBD-PU 2 | 90.0 |
| Ground sulphur 80/90° | 10.0 |

The results achieved were as follows:

Tack at 23° C.: 0.3 N

Tensile Shear Strength:

| Test specimen | Oil application | Curing | Tensile shear strength [MPa] | Fracture mode |
|---|---|---|---|---|
| Steel/steel | no | 30 min/200° C. | 6.5 | cohesive |
| Steel/steel | yes | 30 min/200° C. | 6.9 | cohesive |
| Electrogalvanized steel/electro-galvanized steel | yes | 30 min/200° C. | 5.9 | partially cohesive/ partially adhesive |
| Hot dip galvanized steel/ hot dip galvanized steel | yes | 30 min/200° C. | 5.7 | partially cohesive/ partially adhesive |

Inventive Example 3

The chemical reaction to give the polybutadiene-polyurethane took place in the presence of an epoxy resin. The composition of the polybutadiene-polyurethane (PBD-PU 3), including the epoxy resin, is as follows Composition PBD-PU 3:

| Raw material | Weight fraction [wt %] | Number of OH or NCO groups introduced, based on percentage weight fraction | Percentage ratio of number of OH groups to one another |
|---|---|---|---|
| Krasol LBH 2000 ® | 61.67 | 56.12 mmol OH | 50 |
| 2-Ethyl-1,3-hexanediol | 4.10 | 56.12 mmol OH | 50 |
| Coscat 83 ® | 0.15 | | |
| Desmodur W ® | 14.08 | 106.62 mmol NCO | |
| Epikote 828 ® | 20.00 | | |
| Total | 100.00 | | |

Production took place in a 200 litre mixing vessel. The weight fraction of Desmodur W® is calculated so that the NCO/OH ratio of the polyurethane is 0.95. The theoretical gel point is computed to be 1.0.

PBD-PU 3 (including epoxy resin) at room temperature is solid, meltable and, in terms of consistency, rubber-like and tacky. The test results are summarized in the table below:

Test Results PBD-PU 3 (Including Epoxy Resin):

| | |
|---|---|
| G' (at 1 rad/sec and 23° C.) | 9000 Pa |
| G'' (at 1 rad/sec and 23° C.) | 20 000 Pa |
| G' (at 10 rad/sec and 23° C.) | 70 000 Pa |
| G'' (at 10 rad/sec and 23° C.) | 90 000 Pa |
| Complex viscosity $\eta^*$ at 10 rad/sec and 23° C. | 11 000 Pas |
| Complex viscosity $\eta^*$ at 10 rad/sec and 90° C. | 200 Pas |

Production of the Inventive Adhesive and the Inventive Adhesive Tape Layer:

For producing the inventive adhesive and the inventive adhesive tape layer, PBD-PU 3 (including epoxy resin) was blended further in accordance with the formula below in the twin-screw extruder. The epoxy resin, mixed in as early as during polybutadiene-polyurethane production, is listed separately in the table below.

Composition of the Thermally Vulcanizable Adhesive Tape Layer Based on PBD-PU 3:

| Raw material | Weight percent |
|---|---|
| PBD-PU 3 (excluding epoxy resin) | 51.9 |
| Epikote 828 ® (from PBD-PU 3 production) | 13.0 |
| Ground sulphur 80/90° | 6.9 |
| MBTS | 2.1 |
| ZBEC | 0.9 |
| TBzTD | 0.9 |
| Luvomaxx N220 ® | 8.8 |
| Talc Pharma M ® | 15.5 |

The results achieved were as follows:
Tack (before thermal vulcanization) at 23° C.: 0.6 N
Peel Adhesion (Before Thermal Vulcanization):

| Test specimen | Oil application | Peel adhesion, immediate (N/cm) | Peel adhesion, after 30 minutes (N/cm) |
|---|---|---|---|
| Steel | yes | 0.03 | 0.12 |

Tensile Shear Strength (after Thermal Vulcanization):

| Test specimen | Oil application | Curing | Tensile shear strength [MPa] | Fracture mode |
|---|---|---|---|---|
| Steel/steel | no | 30 min/180° C. | 10.3 | cohesive |
| Steel/steel | yes | 30 min/180° C. | 9.8 | cohesive |
| Steel/steel | yes | 10 min/230° C. | 9.4 | cohesive |
| Electrogalvanized steel/electrogalvanized steel | yes | 30 min/180° C. | 9.1 | cohesive |
| Hot dip galvanized steel/hot dip galvanized steel | yes | 30 min/180° C. | 8.4 | cohesive |
| CEC steel/CEC steel | no | 30 min/140° C. | 8.7 | cohesive |

Inventive Example 4

Production of the Inventive Adhesive and the Inventive Adhesive Tape Layer:

For producing the inventive adhesive and the inventive adhesive tape layer, PBD-PU 3 (including epoxy resin) was used. For this purpose, PBD-PU 3 (including epoxy resin) was blended further in accordance with the formula below in the twin-screw extruder. In the table below, the epoxy resin already mixed in during polybutadiene-polyurethane production is again listed separately.

Composition of the Thermally Vulcanizable Adhesive Tape Layer Based on PBD-PU 3:

| Raw material | Weight percent |
|---|---|
| PBD-PU 3 (excluding epoxy resin) | 44.8 |
| Epikote 828 ® (from PBD-PU 3 production) | 11.3 |
| Ground sulphur 80/90° | 3.5 |
| MBTS | 2.0 |
| ZBEC | 1.0 |
| TBzTD | 1.0 |
| Luvomaxx N220 ® | 0.9 |
| Omyacarb 5-GU ® | 26.1 |
| Rapidquell ® Quicklime CL 90-Q | 3.5 |
| Talc Pharma M ® | 5.9 |

The results achieved were as follows:
Tack (before thermal vulcanization) at 23° C.: 0.5 N
Peel Adhesion (Before Thermal Vulcanization):

| Test specimen | Oil application | Peel adhesion, immediate (N/cm) | Peel adhesion, after 30 minutes (N/cm) |
|---|---|---|---|
| Steel | yes | 0.04 | 0.15 |

Tensile Shear Strength (after Thermal Vulcanization):

| Test specimen | Oil application | Curing | Tensile shear strength [MPa] | Fracture mode |
|---|---|---|---|---|
| Steel/steel | no | 30 min/180° C. | 17.6 | cohesive |
| Steel/steel | yes | 30 min/180° C. | 16.1 | cohesive |
| Electrogalvanized steel/electrogalvanized steel | yes | 30 min/180° C. | 16.9 | cohesive |
| Hot dip galvanized steel/hot dip galvanized steel | yes | 30 min/180° C. | 15.9 | cohesive |
| CEC steel/CEC steel | no | 30 min/130° C. | 7.2 | cohesive |
| CEC steel/CEC steel | no | 30 min/160° C. | 15.5 | cohesive |

Inventive Example 5

Production of the Inventive Adhesive and the Inventive Adhesive Tape Layer:

For producing the inventive adhesive and the inventive adhesive tape layer, PBD-PU 3 (including epoxy resin) was used. For this purpose, PBD-PU 3 (including epoxy resin) was blended further in accordance with the formula below in the twin-screw extruder (TSE).

In the table below, the epoxy resin already mixed in during polybutadiene-polyurethane production is again listed separately.

Composition of the Thermally Vulcanizable Adhesive Tape Layer Based on PBD-PU 3:

| Raw material | Weight percent |
|---|---|
| PBD-PU 3 (excluding epoxy resin) | 44.8 |
| Epikote 828 ® (from PBD-PU 3 production) | 11.3 |
| Ground sulphur 80/90° | 7.0 |
| MBTS | 2.0 |
| ZBEC | 1.0 |
| TBzTD | 1.0 |
| Luvomaxx N220 ® | 0.9 |
| Omyacarb 5-GU ® | 26.1 |
| Rapidquell ® Quicklime CL 90-Q | 3.5 |
| Talc Pharma M ® | 2.4 |

The results achieved were as follows:
Tack (before thermal vulcanization) at 23° C.: 0.5 N
Peel Adhesion (Before Thermal Vulcanization):

| Test specimen | Oil application | Peel adhesion, immediate (N/cm) | Peel adhesion, after 30 minutes (N/cm) |
|---|---|---|---|
| Steel | yes | 0.03 | 0.13 |

Tensile Shear Strength (after Thermal Vulcanization):

| Test specimen | Oil application | Curing | Tensile shear strength [MPa] | Fracture mode |
|---|---|---|---|---|
| Steel/steel | no | 30 min/180° C. | 27.9 | cohesive |
| Steel/steel | yes | 30 min/180° C. | 26.3 | cohesive |
| Electrogalvanized steel/ electrogalvanized steel | yes | 30 min/180° C. | 24.1 | cohesive |
| Hot dip galvanized steel/ hot dip galvanized steel | yes | 30 min/180° C. | 26.1 | cohesive |
| CEC steel/CEC steel | no | 30 min/130° C. | 10.5 | cohesive |
| CEC steel/CEC steel | no | 30 min/160° C. | 24.8 | cohesive |

Inventive Example 6

Production of the Inventive Adhesive and the Inventive Adhesive Tape Layer:

For producing the inventive adhesive and the inventive adhesive tape layer, PBD-PU 3 (including epoxy resin) was used. For this purpose, PBD-PU 3 (including epoxy resin) was blended further in accordance with the formula below in the twin-screw extruder. The prepolymer here was fed into the extruder via a drum melt and forced feeding system (T about 70° C., throughput about 16 kg/h, extruder speed 300 1/min). The melt temperature was maintained at around 100° C., so that there was no crosslinking.

In the table below, the epoxy resin already mixed in during polybutadiene-polyurethane production is again listed separately.

Composition of the Thermally Vulcanizable Adhesive Tape Layer Based on PBD-PU 3:

| Raw material | Weight percent |
|---|---|
| PBD-PU 3 (excluding epoxy resin) | 44.8 |
| Epikote 828 ® (from PBD-PU 3 production) | 11.3 |
| Ground sulphur 80/90° | 3.5 |
| ZBEC | 1.0 |
| TBzTD | 1.0 |
| Luvomaxx N220 ® | 0.9 |
| Omyacarb 5-GU ® | 26.1 |
| Rapidquell ® Quicklime CL 90-Q | 3.5 |
| Talc Pharma M ® | 7.9 |

The results achieved were as follows:
Tack (before thermal vulcanization) at 23° C.: 0.5 N
Peel Adhesion (Before Thermal Vulcanization):

| Test specimen | Oil application | Peel adhesion, immediate (N/cm) | Peel adhesion, after 30 minutes (N/cm) |
|---|---|---|---|
| Steel | yes | 0.04 | 0.15 |

Curing temperature (DSC): 156° C.
Tensile Shear Strength (after Thermal Vulcanization):

| Test specimen | Oil application | Curing | Tensile shear strength [MPa] | Fracture mode |
|---|---|---|---|---|
| Steel/steel | No | 30 min/180° C. | 14.2 | cohesive |
| Steel/steel | Yes | 30 min/180° C. | 12.9 | cohesive |
| Electrogalvanized steel/ electrogalvanized steel | Yes | 30 min/180° C. | 11.8 | cohesive |
| Hot dip galvanized steel/ hot dip galvanized steel | Yes | 30 min/180° C. | 10.7 | cohesive |
| CEC steel/CEC steel | No | 30 min/130° C. | 6.3 | cohesive |
| CEC steel/CEC steel | No | 30 min/160° C. | 11.9 | cohesive |

Inventive Example 6a

Production of the Inventive Adhesive and the Inventive Adhesive Tape Layer:

For producing the inventive adhesive and the inventive adhesive tape layer, PBD-PU 3 (including epoxy resin) was used. For this purpose, PBD-PU 3 (including epoxy resin) was blended further in accordance with the formula below in the planetary roller extruder (PRE). The prepolymer here was fed into the extruder via a drum melt and forced feeding system (T about 70° C., throughput about 16 kg/h, extruder speed 300 1/min). The melt temperature was maintained at around 100° C., so that there was no crosslinking. The objective was to lower the operating temperature in order to diminish the risk of premature crosslinking particularly at elevated proportions of ultra-accelerator.

In the PRE, the powder solids such as talc, chalk, lime (calcium oxide), sulphur and an ultra-accelerator premix were incorporated, depending on formula, into the PU base. The liquid carbon black dispersion was introduced in a downstream TSE, where devolatization was also performed.

The prepolymer here was fed into the extruder (Entex PRE model, four-shot, diameter 70 mm, equipped with standard spindles: 7, 7, 7, 6 per shot) (T around 70° C.) via a drum melt and forced feeding system. (The throughput was around 25 kg/h, the speed 70 1/min). It was found that the reduced spindle count in the last shot is advantageous for a low operating temperature.

To reduce the complexity of metering, premixes were prepared for talc and lime and also for the ultra-accelerators ZBEC and TBzTD. Only chalk and sulphur were metered separately. FIG. 1 shows the construction.

The four roller cylinders were heated descendingly at 70/50/35/35° C., and the central spindle at 20° C. The melt temperature immediately downstream of the PRE was found to be 72° C. The compounded formulation was transferred into the TSE via a melt pump and downstream melt hose, which were heated at 75° C. The individual zones were preselected at 60° C. at a speed of 110 1/min. The hold-down device in the devolatizing region ran at 250 1/min. The exit temperature was approximately 77° C. FIG. 2 shows this plant component schematically.

In the table below, the epoxy resin already mixed in during polybutadiene-polyurethane production is again listed separately.

Composition of the Thermally Vulcanizable Adhesive Tape Layer Based on PBD-PU 3:

| Raw material | Weight percent |
|---|---|
| PBD-PU 3 (excluding epoxy resin) | 44.8 |
| Epikote 828 ® (from PBD-PU 3 production) | 11.3 |
| Ground sulphur 80/90° | 3.5 |
| ZBEC | 1.0 |
| TBzTD | 1.0 |
| Luvomaxx N220 ® | 0.9 |
| Omyacarb 5-GU ® | 26.1 |
| Rapidquell ® Quicklime CL 90-Q | 3.5 |
| Talc Pharma M ® | 7.9 |

The example shows that with the preferred use of a planetary roller extruder, advantageously, the operating temperatures can be lower.

Inventive Example 7

Production of the Inventive Adhesive and the Inventive Adhesive Tape Layer:

For producing the inventive adhesive and the inventive adhesive tape layer, PBD-PU 3 (including epoxy resin) was used. For this purpose, PBD-PU 3 (including epoxy resin) was blended further in accordance with the formula below in the twin-screw extruder similarly to Inventive Example 6.

In the table below, the epoxy resin already mixed in during polybutadiene-polyurethane production is again listed separately.

Composition of the Thermally Vulcanizable Adhesive Tape Layer Based on PBD-PU 3:

| Raw material | Weight percent |
|---|---|
| PBD-PU 3 (excluding epoxy resin) | 44.8 |
| Epikote 828 ® (from PBD-PU 3 production) | 11.3 |
| Ground sulphur 80/90° | 3.5 |
| ZBEC | 1.5 |
| TBzTD | 1.5 |
| Luvomaxx N220 ® | 0.9 |
| Omyacarb 5-GU ® | 26.1 |
| Rapidquell ® Quicklime CL 90-Q | 3.5 |
| Talc Pharma M ® | 6.9 |

The results achieved were as follows:
Tack (before thermal vulcanization) at 23° C.: 0.5 N
Peel Adhesion (Before Thermal Vulcanization):

| Test specimen | Oil application | Peel adhesion, immediate (N/cm) | Peel adhesion, after 30 minutes (N/cm) |
|---|---|---|---|
| Steel | yes | 0.04 | 0.18 |

Curing temperature (DSC): 139° C.
Tensile Shear Strength (after Thermal Vulcanization):

| Test specimen | Oil application | Curing | Tensile shear strength [MPa] | Fracture mode |
|---|---|---|---|---|
| Steel/steel | no | 30 min/180° C. | 17.8 | cohesive |
| Steel/steel | yes | 30 min/180° C. | 17.3 | cohesive |
| Electrogalvanized steel/ electrogalvanized steel | yes | 30 min/180° C. | 17.6 | cohesive |
| Hot dip galvanized steel/ hot dip galvanized steel | yes | 30 min/180° C. | 15.6 | cohesive |
| CEC steel/CEC steel | no | 30 min/130° C. | 12.3 | cohesive |
| CEC steel/CEC steel | no | 30 min/160° C. | 15.2 | cohesive |

Inventive Example 8

Production of the Inventive Adhesive and the Inventive Adhesive Tape Layer:

For producing the inventive adhesive and the inventive adhesive tape layer, PBD-PU 3 (including epoxy resin) was used. For this purpose, PBD-PU 3 (including epoxy resin) was blended further in accordance with the formula below in the twin-screw extruder. In the table below, the epoxy resin already mixed in during polybutadiene-polyurethane production is again listed separately.

Composition of the Thermally Vulcanizable Adhesive Tape Layer Based on PBD-PU 3:

| Raw material | Weight percent |
|---|---|
| PBD-PU 3 (excluding epoxy resin) | 44.8 |
| Epikote 828 ® (from PBD-PU 3 production) | 11.3 |
| Ground sulphur 80/90° | 3.5 |
| ZBEC | 3.0 |
| TBzTD | 3.0 |
| Luvomaxx N220 ® | 0.9 |
| Omyacarb 5-GU ® | 26.1 |
| Rapidquell ® Quicklime CL 90-Q | 3.5 |
| Talc Pharma M ® | 3.9 |

The results achieved were as follows:
Tack (before thermal vulcanization) at 23° C.: 0.4 N
Peel Adhesion (Before Thermal Vulcanization):

| Test specimen | Oil application | Peel adhesion, immediate (N/cm) | Peel adhesion, after 30 minutes (N/cm) |
|---|---|---|---|
| Steel | Yes | 0.04 | 0.18 |

The curing temperature of the adhesive was adjustable below the range known for customary vulcanization adhesives of 130-250° C., owing to the very high level of ultra-accelerators, and was 120° C.

Tensile Shear Strength (after Thermal Vulcanization):

| Test specimen | Oil applicaton | Curing | Tensile shear strength [MPa] | Fracture mode |
|---|---|---|---|---|
| Steel/steel | no | 30 min/180° C. | 17.8 | cohesive |
| Steel/steel | yes | 30 min/180° C. | 17.1 | cohesive |
| Electrogalvanized steel/electrogalvanized steel | yes | 30 min/180° C. | 17.0 | cohesive |
| Hot dip galvanized steel/hot dip galvanized steel | yes | 30 min/180° C. | 15.9 | cohesive |
| CEC steel/CEC steel | no | 30 min/130° C. | 15.4 | cohesive |
| CEC steel/CEC steel | no | 30 min/160° C. | 15.8 | cohesive |

With the present high level of ultra-accelerators and with the correspondingly low curing temperature, initial crosslinking phenomena became evident in the TSE (specks, gelling).

Inventive Example 8a

Production of the Inventive Adhesive and the Inventive Adhesive Tape Layer:

For producing the inventive adhesive and the inventive adhesive tape layer, PBD-PU 3 (including epoxy resin) was used. Because of the initial crosslinking phenomena evident in the TSE, PBD-PU 3 (including epoxy resin) was blended further in accordance with the formula below in the planetary roller extruder similarly to Inventive Example 6a. In the table below, the epoxy resin already mixed in during polybutadiene-polyurethane production is again listed separately.

Composition of the Thermally Vulcanizable Adhesive Tape Layer Based on PBD-PU 3:

| Raw material | Weight percent |
|---|---|
| PBD-PU 3 (excluding epoxy resin) | 44.8 |
| Epikote 828 ® (from PBD-PU 3 production) | 11.3 |
| Ground sulphur 80/90° | 3.5 |
| ZBEC | 3.0 |
| TBzTD | 3.0 |
| Luvomaxx N220 ® | 0.9 |
| Omyacarb 5-GU ® | 26.1 |
| Rapidquell ® Quicklime CL 90-Q | 3.5 |
| Talc Pharma M ® | 3.9 |

It was possible to keep the temperatures in the PRE and downstream TSE below 80° C., and so there was no specking/gel.

Inventive Examples 6-8a, each with increasing level of curing agents and hence falling curing temperatures, show that the planetary roller extruder represents the preferred apparatus for the compounding of thermally curable adhesives, since the cure reaction does not exhibit offset during the production of adhesive and adhesive tape, owing to the low temperatures with this assembly, even when the level of curing agents is very high and the curing temperature, correspondingly, is low.

Inventive Example 9

The chemical reaction to give the polybutadiene-polyurethane took place in the presence of an epoxy resin and a tackifier resin. The composition of the polybutadiene-polyurethane (PBD-PU 9), including the epoxy resin and the tackifier resin, is as follows:

Composition PBD-PU 9:

| Raw material | Weight fraction [wt %] | Number of OH or NCO groups introduced, based on percentage weight fraction | Percentage ratio of number of OH groups to one another |
|---|---|---|---|
| Krasol LBH 2000 ® | 54.99 | 50.04 mmol OH | 50 |
| 2-Ethyl-1,3-hexanediol | 3.66 | 50.04 mmol OH | 50 |
| Coscat 83 ® | 0.13 | | |
| Desmodur W ® | 12.56 | 95.09 mmol NCO | |
| Epikote 828 ® | 17.84 | | |
| Dercolyte S115 ® | 10.82 | | |
| Total | 100.00 | | |

Production took place in a laboratory batch (1 litre). The weight fraction of Desmodur W® is calculated so that the NCO/OH ratio of the polyurethane is 0.95. The theoretical gel point is computed to be 1.0.

PBD-PU 9 (including epoxy resin and tackifier resin) at room temperature is solid, meltable and, in terms of consistency, rubber-like and tacky. The test results are summarized in the table below:

Test Results PBD-PU 9 (Including Epoxy Resin and Tackifier Resin):

| | |
|---|---|
| G' (at 1 rad/sec and 23° C.) | 30 000 Pa |
| G" (at 1 rad/sec and 23° C.) | 45 000 Pa |
| G' (at 10 rad/sec and 23° C.) | 130 000 Pa |
| G" (at 10 rad/sec and 23° C.) | 140 000 Pa |
| Complex viscosity η* at 10 rad/sec and 23° C. | 19 000 Pas |
| Complex viscosity η* at 10 rad/sec and 90° C. | 260 Pas |

Production of the Inventive Adhesive and the Inventive Adhesive Tape Layer:

For producing the inventive adhesive and the inventive adhesive tape layer, PBD-PU 9 (including epoxy resin and tackifier resin) was blended further in accordance with the formula below in the laboratory batch and shaped to form a film.

The epoxy and tackifier resins, mixed in as early as during polybutadiene-polyurethane production, are listed separately in the table below.

Composition of the Thermally Vulcanizable Adhesive Tape Layer Based on PBD-PU 9:

| Raw material | Weight percent |
|---|---|
| PBD-PU 9 (excluding epoxy and tackifier resins) | 47.5 |
| Epikote 828 ® (from PBD-PU 9 production) | 11.9 |
| Dercolyte S115 ® (from PBD-PU 9 production) | 7.2 |

| Raw material | Weight percent |
|---|---|
| Ground sulphur 80/90° | 7.2 |
| MBTS | 2.2 |
| Printex 60 ® | 1.0 |
| Omyacarb 5-GU ® | 19.4 |
| Rapidquell ® Quicklime CL 90-Q | 3.6 |

The results achieved were as follows:
Tack (before thermal vulcanization) at 23° C.: 1.2 N
Peel Adhesion (Before Thermal Vulcanization):

| Test specimen | Oil application | Peel adhesion, immediate (N/cm) | Peel adhesion, after 30 minutes (N/cm) |
|---|---|---|---|
| Steel | yes | 0.2 | 1.8 |

Tensile Shear Strength (after Thermal Vulcanization).

| Test specimen | Oil application | Curing | Tensile shear strength [MPa] | Fracture mode |
|---|---|---|---|---|
| Steel/steel | no | 30 min/180° C. | 14.2 | cohesive |
| Steel/steel | yes | 30 min/180° C. | 13.8 | cohesive |
| Electrogalvanized steel/electrogalvanized steel | yes | 30 min/180° C. | 13.6 | cohesive |
| Hot dip galvanized steel/hot dip galvanized steel | yes | 30 min/180° C. | 12.4 | cohesive |

Inventive Example 10

The chemical reaction to give the polybutadiene-polyurethane took place in the presence of an epoxy resin and a tackifier resin. The composition of the polybutadiene-polyurethane (PBD-PU 10), including the epoxy resin and the tackifier resin, is as follows:

Composition PBD-PU 10:

| Raw material | Weight fraction [wt %] | Number of OH or NCO groups introduced, based on percentage weight fraction | Percentage ratio of number of OH groups to one another |
|---|---|---|---|
| Krasol LBH 2000 ® | 54.99 | 50.04 mmol OH | 50 |
| 2-Ethyl-1,3-hexanediol | 3.66 | 50.04 mmol OH | 50 |
| Coscat 83 ® | 0.13 | | |
| Desmodur W ® | 12.56 | 95.09 mmol NCO | |
| Epikote 828 ® | 17.84 | | |
| Wingtack ® 10 | 10.82 | | |
| Total | 100.00 | | |

Production took place in a laboratory batch (1 litre). The weight fraction of Desmodur W® is calculated so that the NCO/OH ratio of the polyurethane is 0.95. The theoretical gel point is computed to be 1.0.

PBD-PU 10 (including epoxy resin and tackifier resin) at room temperature is solid, meltable and, in terms of consistency, rubber-like and tacky. The test results are summarized in the table below:

Test Results PBD-PU 10 (Including Epoxy Resin and Tackifier Resin):

| | |
|---|---|
| G' (at 1 rad/sec and 23° C.) | 18 000 Pa |
| G" (at 1 rad/sec and 23° C.) | 32 000 Pa |
| G' (at 10 rad/sec and 23° C.) | 100 000 Pa |
| G" (at 10 rad/sec and 23° C.) | 120 000 Pa |
| Complex viscosity η* at 10 rad/sec and 23° C. | 16 000 Pas |
| Complex viscosity η* at 10 rad/sec and 90° C. | 220 Pas |

Production of the Inventive Adhesive and the Inventive Adhesive Tape Layer:

For producing the inventive adhesive and the inventive adhesive tape layer, PBD-PU 10 (including epoxy resin and tackifier resin) was blended further in accordance with the formula below in the laboratory batch and shaped to form a film.

The epoxy and tackifier resins, mixed in as early as during polybutadiene-polyurethane production, are listed separately in the table below.

Composition of the Thermally Vulcanizable Adhesive Tape Layer Based on PBD-PU 10:

| Raw material | Weight percent |
|---|---|
| PBD-PU 10 (excluding epoxy and tackifier resins) | 47.5 |
| Epikote 828 ® (from PBD-PU 10 production) | 11.9 |
| Wingtack ® 10 (from PBD-PU 10 production) | 7.2 |
| Ground sulphur 80/90° | 7.2 |
| MBTS | 2.2 |
| Printex 60 ® | 1.0 |
| Omyacarb 5-GU ® | 19.4 |
| Rapidquell ® Quicklime CL 90-Q | 3.6 |

The results achieved were as follows:
Tack (before thermal vulcanization) at 23° C.: 1.0 N
Peel Adhesion (Before Thermal Vulcanization):

| Test specimen | Oil application | Peel adhesion, immediate (N/cm) | Peel adhesion, after 30 minutes (N/cm) |
|---|---|---|---|
| Steel | Yes | 0.1 | 0.28 |

Tensile Shear Strength (after Thermal Vulcanization):

| Test specimen | Oil application | Curing | Tensile shear strength [MPa] | Fracture mode |
|---|---|---|---|---|
| Steel/steel | no | 30 min/180° C. | 13.7 | cohesive |
| Steel/steel | yes | 30 min/180° C. | 12.2 | cohesive |
| Electrogalvanized steel/electrogalvanized steel | yes | 30 min/180° C. | 11.9 | cohesive |
| Hot dip galvanized steel/hot dip galvanized steel | yes | 30 min/180° C. | 12.1 | cohesive |

Inventive Example 11

The chemical reaction to give the polybutadiene-polyurethane took place in the presence of an epoxy resin and bitumen. The composition of the polybutadiene-polyurethane (PBD-PU 11), including the epoxy resin and the bitumen, is as follows:

Composition PBD-PU 11:

| Raw material | Weight fraction [wt %] | Number of OH or NCO groups introduced, based on percentage weight fraction | Percentage ratio of number of OH groups to one another |
|---|---|---|---|
| Krasol LBH 2000 ® | 54.99 | 50.04 mmol OH | 50 |
| 2-Ethyl-1,3-hexanediol | 3.66 | 50.04 mmol OH | 50 |
| Coscat 83 ® | 0.13 | | |
| Desmodur W ® | 12.56 | 95.09 mmol NCO | |
| Epikote 828 ® | 17.84 | | |
| Azalt 50/70 DE ® | 10.82 | | |
| Total | 100.00 | | |

Production took place in a laboratory batch (1 litre). The weight fraction of Desmodur W® is calculated so that the NCO/OH ratio of the polyurethane is 0.95. The theoretical gel point is computed to be 1.0.

PBD-PU 11 (including epoxy resin and bitumen) at room temperature is solid, meltable and, in terms of consistency, rubber-like and tacky. The test results are summarized in the table below:

Test Results PBD-PU 11 (Including Epoxy Resin and Bitumen):

| | |
|---|---|
| G' (at 1 rad/sec and 23° C.) | 25 000 Pa |
| G" (at 1 rad/sec and 23° C.) | 39 000 Pa |
| G' (at 10 rad/sec and 23° C.) | 110 000 Pa |
| G" (at 10 rad/sec and 23° C.) | 130 000 Pa |
| Complex viscosity η* at 10 rad/sec and 23° C. | 17 000 Pas |
| Complex viscosity η* at 10 rad/sec and 90° C. | 240 Pas |

Production of the Inventive Adhesive and the Inventive Adhesive Tape Layer:

For producing the inventive adhesive and the inventive adhesive tape layer, PBD-PU 11 (including epoxy resin and bitumen) was blended further in accordance with the formula below in the laboratory batch and shaped to form a film.

The epoxy resin and bitumen, mixed in as early as during polybutadiene-polyurethane production, are listed separately in the table below.

Composition of the Thermally Vulcanizable Adhesive Tape Layer Based on PBD-PU 11:

| Raw material | Weight percent |
|---|---|
| PBD-PU 11 (excluding epoxy resin and bitumen) | 47.5 |
| Epikote 828 ® (from PBD-PU 11 production) | 11.9 |
| Azalt 50/70 DE ® (from PBD-PU 11 production) | 7.2 |
| Ground sulphur 80/90° | 7.2 |
| MBTS | 2.2 |
| Printex 60 ® | 1.0 |
| Omyacarb 5-GU ® | 19.4 |
| Rapidquell ® Quicklime CL 90-Q | 3.6 |

The results achieved were as follows:

Tack (before thermal vulcanization) at 23° C.: 1.2 N

Peel Adhesion (Before Thermal Vulcanization):

| Test specimen | Oil application | Peel adhesion, immediate (N/cm) | Peel adhesion, after 30 minutes (N/cm) |
|---|---|---|---|
| Steel | Yes | 0.1 | 0.22 |

Tensile Shear Strength (after Thermal Vulcanization):

| Test specimen | Oil application | Curing | Tensile shear strength [MPa] | Fracture mode |
|---|---|---|---|---|
| Steel/steel | no | 30 min/180° C. | 13.2 | cohesive |
| Steel/steel | yes | 30 min/180° C. | 14.9 | cohesive |
| Electrogalvanized steel/electrogalvanized steel | yes | 30 min/180° C. | 13.7 | cohesive |
| Hot dip galvanized steel/hot dip galvanized steel | yes | 30 min/180° C. | 13.1 | cohesive |

Inventive Example 12

The chemical reaction to give the polybutadiene-polyurethane took place in the presence of an epoxy resin. The composition of the polybutadiene-polyurethane (PBD-PU 12), including the epoxy resin, is as follows:

Composition PBD-PU 12:

| Raw material | Weight fraction [wt %] | Number of OH or NCO groups introduced, based on percentage weight fraction | Percentage ratio of number of OH groups to one another |
|---|---|---|---|
| Krasol LBH 2000 ® | 61.67 | 56.12 mmol OH | 50 |
| 2-Ethyl-1,3-hexanediol | 4.10 | 56.12 mmol OH | 50 |
| Coscat 83 ® | 0.15 | | |
| Desmodur W ® | 14.08 | 106.62 mmol NCO | |
| 3,4-Epoxycyclohexyl-methyl 3',4'-epoxycyclohexane-carboxylate | 20.00 | | |
| Total | 100.00 | | |

Production took place in a laboratory batch (1 litre). The weight fraction of Desmodur W® is calculated so that the NCO/OH ratio of the polyurethane is 0.95. The theoretical gel point is computed to be 1.0.

PBD-PU 12 (including epoxy resin) at room temperature is solid, meltable and, in terms of consistency, rubber-like and tacky. The test results are summarized in the table below:

Test Results PBD-PU 12 (Including Epoxy Resin):

| | |
|---|---|
| G' (at 1 rad/sec and 23° C.) | 7000 Pa |
| G" (at 1 rad/sec and 23° C.) | 16 000 Pa |
| G' (at 10 rad/sec and 23° C.) | 50 000 Pa |
| G" (at 10 rad/sec and 23° C.) | 70 000 Pa |
| Complex viscosity η* at 10 rad/sec and 23° C. | 6600 Pas |
| Complex viscosity η* at 10 rad/sec and 90° C. | 180 Pas |

Production of the Inventive Adhesive and the Inventive Adhesive Tape Layer:

For producing the inventive adhesive and the inventive adhesive tape layer, PBD-PU 12 (including epoxy resin) was blended further in accordance with the formula below in the laboratory batch, and shaped to form a film.

The epoxy resin, mixed in as early as during polybutadiene-polyurethane production, is listed separately in the table below.

Composition of the Thermally Vulcanizable Adhesive Tape Layer Based on PBD-PU 12:

| Raw material | Weight percent |
|---|---|
| PBD-PU 12 (excluding epoxy resin) | 44.8 |
| 3,4-Epoxycyclohexylmethyl 3',4'-epoxycyclohexane-carboxylate (from PBD-PU 12 production) | 11.3 |
| Ground sulphur 80/90° | 3.5 |
| ZBEC | 1.5 |
| TBzTD | 1.5 |
| Printex60 ® | 0.9 |
| Omyacarb 5-GU ® | 26.1 |
| Rapidquell ® Quicklime CL 90-Q | 3.5 |
| Talc Pharma M ® | 6.9 |

The results achieved were as follows:
Tack (before thermal vulcanization) at 23° C.: 0.4 N Peel Adhesion (Before Thermal Vulcanization):

| Test specimen | Oil application | Peel adhesion, immediate (N/cm) | Peel adhesion, after 30 minutes (N/cm) |
|---|---|---|---|
| Steel | yes | 0.03 | 0.15 |

Tensile Shear Strength (after Thermal Vulcanization):

| Test specimen | Oil application | Curing | Tensile shear strength [MPa] | Fracture mode |
|---|---|---|---|---|
| Steel/steel | no | 30 min/180° C. | 15.2 | Cohesive |
| Steel/steel | yes | 30 min/180° C. | 14.7 | Cohesive |
| Electrogalvanized steel/electrogalvanized steel | yes | 30 min/180° C. | 13.6 | Cohesive |
| Hot dip galvanized steel/hot dip galvanized steel | yes | 30 min/180° C. | 14.9 | Cohesive |
| CEC steel/ CEC steel | no | 30 min/130° C. | 13.1 | Cohesive |
| CEC steel/CEC steel | no | 30 min/160° C. | 15.9 | Cohesive |

Inventive Example 13

The chemical reaction to give the polybutadiene-polyurethane took place in the presence of a plasticizer. The composition of the polybutadiene-polyurethane (PBD-PU 13), including the plasticizer, is as follows:

Composition PBD-PU 13:

| Raw material | Weight fraction [wt %] | Number of OH or NCO groups introduced, based on percentage weight fraction | Percentage ratio of number of OH groups to one another |
|---|---|---|---|
| Krasol LBH 2000 ® | 61.67 | 56.12 mmol OH | 50 |
| 2-Ethyl-1,3-hexanediol | 4.10 | 56.12 mmol OH | 50 |
| Coscat 83 ® | 0.15 | | |
| Desmodur W ® | 14.08 | 106.62 mmol NCO | |
| Gravex 925 ® | 20.00 | | |
| Total | 100.00 | | |

Production took place in a laboratory batch (1 litre). The weight fraction of Desmodur W® is calculated so that the NCO/OH ratio of the polyurethane is 0.95. The theoretical gel point is computed to be 1.0.

PBD-PU 13 (including plasticizer) at room temperature is solid, meltable and, in terms of consistency, rubber-like and tacky. The test results are summarized in the table below:

Test Results PBD-PU 13 (Including Plasticizer):

| | |
|---|---|
| G' (at 1 rad/sec and 23° C.) | 5000 Pa |
| G" (at 1 rad/sec and 23° C.) | 11 000 Pa |
| G' (at 10 rad/sec and 23° C.) | 35 000 Pa |
| G" (at 10 rad/sec and 23° C.) | 60 000 Pa |
| Complex viscosity η* at 10 rad/sec and 23° C. | 6900 Pas |
| Complex viscosity η* at 10 rad/sec and 90° C. | 180 Pas |

Production of the Inventive Adhesive and the Inventive Adhesive Tape Layer:

For producing the inventive adhesive and the inventive adhesive tape layer, PBD-PU 13 (including plasticizer) was blended further in accordance with the formula below in the laboratory batch, and shaped to form a film.

The plasticizer, mixed in as early as during polybutadiene-polyurethane production, is listed separately in the table below.

Composition of the thermally vulcanizable adhesive tape layer based on PBD-PU 13:

| Raw material | Weight percent |
| --- | --- |
| PBD-PU 13 (excluding plasticizer) | 44.8 |
| Gravex 925 ® (from PBD-PU 13 production) | 11.3 |
| Ground sulphur 80/90° | 3.5 |
| ZBEC | 1.5 |
| TBzTD | 1.5 |
| Printex 60 ® | 0.9 |
| Omyacarb 5-GU ® | 26.1 |
| Rapidquell ® Quicklime CL 90-Q | 3.5 |
| Talc Pharma M ® | 6.9 |

The results achieved were as follows:
Tack (before thermal vulcanization) at 23° C.: 0.5 N
Peel Adhesion (Before Thermal Vulcanization):

| Test specimen | Oil application | Peel adhesion, immediate (N/cm) | Peel adhesion, after 30 minutes (N/cm) |
| --- | --- | --- | --- |
| Steel | Yes | 0.03 | 0.11 |

Tensile Shear Strength (after Thermal Vulcanization):

| Test specimen | Oil application | Curing | Tensile shear strength [MPa] | Fracture mode |
| --- | --- | --- | --- | --- |
| Steel/steel | No | 30 min/180° C. | 13.2 | cohesive |
| Steel/steel | Yes | 30 min/180° C. | 13.7 | cohesive |
| Electrogalvanized steel/electrogalvanized steel | Yes | 30 min/180° C. | 12.1 | cohesive |
| Hot dip galvanized steel/hot dip galvanized steel | Yes | 30 min/180° C. | 12.0 | cohesive |
| CEC steel/CEC steel | No | 30 min/130° C. | 11.6 | cohesive |
| CEC steel/CEC steel | No | 30 min/160° C. | 13.6 | cohesive |

Inventive Example 14

The chemical reaction to give the polybutadiene-polyurethane took place in the presence of an epoxy resin. The composition of the polybutadiene-polyurethane (PBD-PU 14), including the epoxy resin, is as follows:
Composition PBD-PU 14:

| Raw material | Weight fraction [wt %] | Number of OH or NCO groups introduced, based on percentage weight fraction | Percentage ratio of number of OH groups to one another |
| --- | --- | --- | --- |
| Krasol LBH 2000 ® | 63.44 | 57.73 mmol OH | 50 |
| 2-Ethyl-1,3-hexanediol | 4.22 | 57.73 mmol OH | 50 |
| Coscat 83 ® | 0.15 | | |
| Vestanat IPDI ® | 12.19 | 109.69 mmol NCO | |
| Epikote 828 ® | 20.00 | | |
| Total | 100.00 | | |

Production took place in a laboratory batch (1 litre). The weight fraction of Vestanat IPDI® is calculated so that the NCO/OH ratio of the polyurethane is 0.95. The theoretical gel point is computed to be 1.0.

PBD-PU 14 (including epoxy resin) at room temperature is solid, meltable and, in terms of consistency, rubber-like and tacky. The test results are summarized in the table below:
Test Results PBD-PU 14 (Including Epoxy Resin):

| | |
| --- | --- |
| G' (at 1 rad/sec and 23° C.) | 7000 Pa |
| G" (at 1 rad/sec and 23° C.) | 14 000 Pa |
| G' (at 10 rad/sec and 23° C.) | 50 000 Pa |
| G" (at 10 rad/sec and 23° C.) | 80 000 Pa |
| Complex viscosity η* at 10 rad/sec and 23° C. | 9400 Pas |
| Complex viscosity η* at 10 rad/sec and 90° C. | 190 Pas |

Production of the Inventive Adhesive and the Inventive Adhesive Tape Layer:

For producing the inventive adhesive and the inventive adhesive tape layer, PBD-PU 14 (including epoxy resin) was blended further in accordance with the formula below in the laboratory batch, and shaped to form a film.

The epoxy resin, mixed in as early as during polybutadiene-polyurethane production, is listed separately in the table below.

Composition of the Thermally Vulcanizable Adhesive Tape Layer Based on PBD-PU 14:

| Raw material | Weight percent |
| --- | --- |
| PBD-PU 14 (excluding epoxy resin) | 44.8 |
| Epikote 828 ® (from PBD-PU 14 production) | 11.3 |
| Ground sulphur 80/90° | 3.5 |
| ZBEC | 1.5 |
| TBzTD | 1.5 |
| Printex 60 ® | 0.9 |
| Omyacarb 5-GU ® | 26.1 |
| Rapidquell ® Quicklime CL 90-Q | 3.5 |
| Talc Pharma M ® | 6.9 |

The results achieved were as follows:
Tack (before thermal vulcanization) at 23° C.: 0.7 N
Peel Adhesion (Before Thermal Vulcanization):

| Test specimen | Oil application | Peel adhesion, immediate (N/cm) | Peel adhesion, after 30 minutes (N/cm) |
| --- | --- | --- | --- |
| Steel | yes | 0.05 | 0.15 |

Tensile Shear Strength (after Thermal Vulcanization):

| Test specimen | Oil application | Curing | Tensile shear Strength [MPa] | Fracture mode |
| --- | --- | --- | --- | --- |
| Steel/steel | No | 30 min/180° C. | 12.2 | cohesive |
| Steel/steel | Yes | 30 min/180° C. | 12.5 | cohesive |
| Electrogalvanized steel/electro-galvanized steel | Yes | 30 min/180° C. | 12.7 | cohesive |
| Hot dip galvanized steel/hot dip galvanized steel | Yes | 30 min/180° C. | 11.9 | cohesive |
| CEC steel/CEC steel | No | 30 min/130° C. | 10.8 | cohesive |
| CEC steel/CEC steel | No | 30 min/160° C. | 12.4 | cohesive |

Inventive Example 15

The chemical reaction to give the polybutadiene-polyurethane took place in the presence of an epoxy resin. The composition of the polybutadiene-polyurethane (PBD-PU 15), including the epoxy resin, is as follows:

Composition PBD-PU 15:

| Raw material | Weight fraction [wt %] | Number of OH or NCO groups introduced, based on percentage weight fraction | Percentage ratio of number of OH groups to one another |
| --- | --- | --- | --- |
| Krasol LBH 2000 ® | 28.89 | 26.29 mmol OH | 20 |
| Poly bd R-45 HTLO ® | 31.30 | 26.29 mmol OH | 20 |
| 2-Ethyl-1,3-hexanediol | 5.77 | 78.88 mmol OH | 60 |
| Coscat 83 ® | 0.15 | | |
| Desmodur W ® | 13.89 | 105.17 mmol NCO | |
| Epikote 828 ® | 20.00 | | |
| Total | 100.00 | | |

Production took place in a laboratory batch (1 litre). The weight fraction of Desmodur W® is calculated so that the NCO/OH ratio of the polyurethane is 0.80. The theoretical gel point is computed to be 0.83.

PBD-PU 15 (including epoxy resin) at room temperature is solid, meltable and, in terms of consistency, rubber-like and tacky. The test results are summarized in the table below:

Test Results PBD-PU 15 (Including Epoxy Resin):

| | |
| --- | --- |
| G' (at 1 rad/sec and 23° C.) | 1500 Pa |
| G'' (at 1 rad/sec and 23° C.) | 5000 Pa |
| G' (at 10 rad/sec and 23° C.) | 15 000 Pa |
| G'' (at 10 rad/sec and 23° C.) | 60 000 Pa |
| Complex viscosity η* at 10 rad/sec and 23° C. | 6200 Pas |
| Complex viscosity η* at 10 rad/sec and 90° C. | 160 Pas |

Production of the Inventive Adhesive and the Inventive Adhesive Tape Layer:

For producing the inventive adhesive and the inventive adhesive tape layer, PBD-PU 15 (including epoxy resin) was blended further in accordance with the formula below in the laboratory batch, and shaped to form a film.

The epoxy resin, mixed in as early as during polybutadiene-polyurethane production, is listed separately in the table below.

Composition of the Thermally Vulcanizable Adhesive Tape Layer Based on PBD-PU 15:

| Raw material | Weight percent |
| --- | --- |
| PBD-PU 15 (excluding epoxy resin) | 44.8 |
| Epikote 828 ® (from PBD-PU 15 production) | 11.3 |
| Ground sulphur 80/90° | 3.5 |
| ZBEC | 1.5 |
| TBzTD | 1.5 |
| Printex 60 ® | 0.9 |
| Omyacarb 5-GU ® | 26.1 |
| Rapidquell ® Quicklime CL 90-Q | 3.5 |
| Talc Pharma M ® | 6.9 |

The results achieved were as follows:

Tack (before thermal vulcanization) at 23° C.: 1.5 N

Peel Adhesion (Before Thermal Vulcanization):

| Test specimen | Oil application | Peel adhesion, immediate (N/cm) | Peel adhesion, after 30 minutes (N/cm) |
| --- | --- | --- | --- |
| Steel | Yes | 0.08 | 0.19 |

Tensile Shear Strength (after Thermal Vulcanization):

| Test specimen | Oil application | Curing | Tensile shear strength [MPa] | Fracture mode |
| --- | --- | --- | --- | --- |
| Steel/steel | No | 30 min/180° C. | 13.8 | cohesive |
| Steel/steel | Yes | 30 min/180° C. | 13.1 | cohesive |
| Electrogalvanized steel/electrogalvanized steel | Yes | 30 min/180° C. | 12.9 | cohesive |
| Hot dip galvanized steel/hot dip galvanized steel | Yes | 30 min/180° C. | 12.4 | cohesive |
| CEC steel/CEC steel | No | 30 min/130° C. | 12.5 | cohesive |
| CEC steel/CEC steel | No | 30 min/160° C. | 10.6 | cohesive |

Comparative Example 1

The chemical reaction to give the polyurethane took place in the presence of an epoxy resin. The composition of the polyurethane (PU-C1), including the epoxy resin, is as follows:

Composition PU-C1:

| Raw material | Weight fraction [wt %] | Number of OH or NCO groups introduced, based on percentage weight fraction | Percentage ratio of number of OH groups to one another |
| --- | --- | --- | --- |
| Krasol LBH 2000 ® | 31.82 | 28.95 mmol OH | 25 |
| Voranol P 2000L ® | 29.27 | 28.95 mmol OH | 25 |
| 2-Ethyl-1,3-hexanediol | 4.23 | 57.90 mmol OH | 50 |
| Coscat 83 ® | 0.15 | | |
| Desmodur W ® | 14.53 | 110.01 mmol NCO | |
| Epikote 828 ® | 20.00 | | |
| Total | 100.00 | | |

Production took place in a laboratory batch (1 litre). The weight fraction of Desmodur W® is calculated so that the NCO/OH ratio of the polyurethane is 0.95. The theoretical gel point is computed to be 1.0.

PU-C1 (including epoxy resin) at room temperature is solid, meltable and, in terms of consistency, rubber-like and tacky. The test results are summarized in the table below:

Test Results PU-C1 (Including Epoxy Resin):

| | |
| --- | --- |
| G' (at 1 rad/sec and 23° C.) | 7000 Pa |
| G'' (at 1 rad/sec and 23° C.) | 18 000 Pa |
| G' (at 10 rad/sec and 23° C.) | 60 000 Pa |
| G'' (at 10 rad/sec and 23° C.) | 80 000 Pa |
| Complex viscosity η* at 10 rad/sec and 23° C. | 10 000 Pas |
| Complex viscosity η* at 10 rad/sec and 90° C. | 190 Pas |

Production of the Comparative Adhesive Tape Layer:

For producing the comparative adhesive tape layer, PU-C1 (including epoxy resin) was blended further in accordance with the formula below in the laboratory batch, and shaped to form a film.

The epoxy resin, mixed in as early as during polyurethane production, is listed separately in the table below.

Composition of the Comparative Adhesive Tape Layer Based on PU-C1:

| Raw material | Weight percent |
|---|---|
| PU-C1 (excluding epoxy resin) | 44.8 |
| Epikote 828 ® (from PU-C1 production) | 11.3 |
| Ground sulphur 80/90° | 3.5 |
| ZBEC | 1.5 |
| TBzTD | 1.5 |
| Printex 60 ® | 0.9 |
| Omyacarb 5-GU ® | 26.1 |
| Rapidquell ® Quicklime CL 90-Q | 3.5 |
| Talc Pharma M ® | 6.9 |

The results achieved were as follows:

Tack (before thermal vulcanization) at 23° C.: 0.6 N

Peel Adhesion (Before Thermal Vulcanization):

| Test specimen | Oil application | Peel adhesion, immediate (N/cm) | Peel adhesion, after 30 minutes (N/cm) |
|---|---|---|---|
| Steel | yes | 0.05 | 0.12 |

Tensile Shear Strength (after Thermal Vulcanization):

| Test specimen | Oil application | Curing | Tensile shear strength [MPa] | Fracture mode |
|---|---|---|---|---|
| Steel/steel | no | 30 min/180° C. | 1.3 | adhesive |
| Steel/steel | yes | 30 min/180° C. | 1.1 | adhesive |
| Electrogalvanized steel/electro-galvanized steel | yes | 30 min/180° C. | 1.2 | adhesive |
| Hot dip galvanized steel/hot dip galvanized steel | yes | 30 min/180° C. | 1.4 | adhesive |
| CEC steel/CEC steel | no | 30 min/130° C. | 0.6 | cohesive |
| CEC steel/CEC steel | no | 30 min/160° C. | 0.9 | cohesive |

Comparative Example 2

The composition of the polyurethane (PU-C2), is as follows:

Composition PU-C2:

| Raw material | Weight fraction [wt %] | Number of OH or NCO groups introduced, based on percentage weight fraction | Percentage ratio of number of OH groups to one another |
|---|---|---|---|
| Poly bd R-45 HTLO ® | 78.49 | 65.93 mmol OH | 50 |
| 2-Ethyl-1,3-hexanediol | 4.82 | 65.93 mmol OH | 50 |
| Coscat 83 ® | 0.15 | | |
| Desmodur W ® | 16.55 | 125.26 mmol NCO | |
| Total | 100.00 | | |

Production took place in a laboratory batch (1 litre). The weight fraction of Desmodur W® is calculated so that the NCO/OH ratio of the polyurethane is 0.95. The theoretical gel point is computed to be 0.67.

PU-C2 at room temperature is solid and not meltable.

Figure 1:
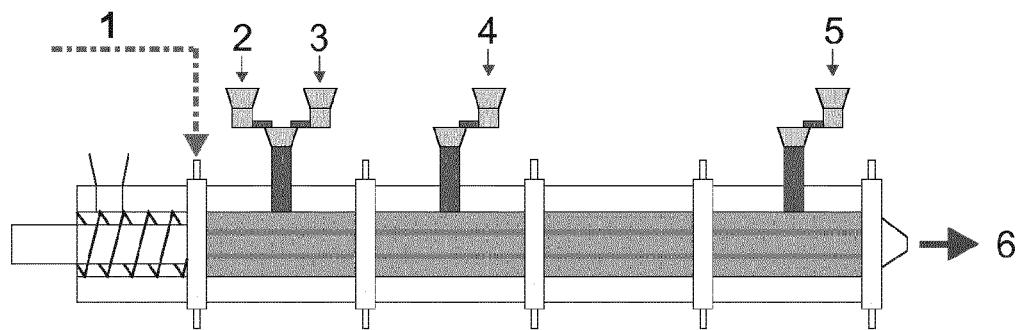
FIG. 1 illustrates a planetary roller extruder in an embodiment, wherein
1: Feed of polybutadiene-polyurethane
2: Inlet for sulphur
3: Inlet for chalk
4: Inlet for talc & lime premix
5: Inlet for ultra-accelerator premix (ZBEC/TBzTD)
6: Outlet for compounded formulation
Figure 2:
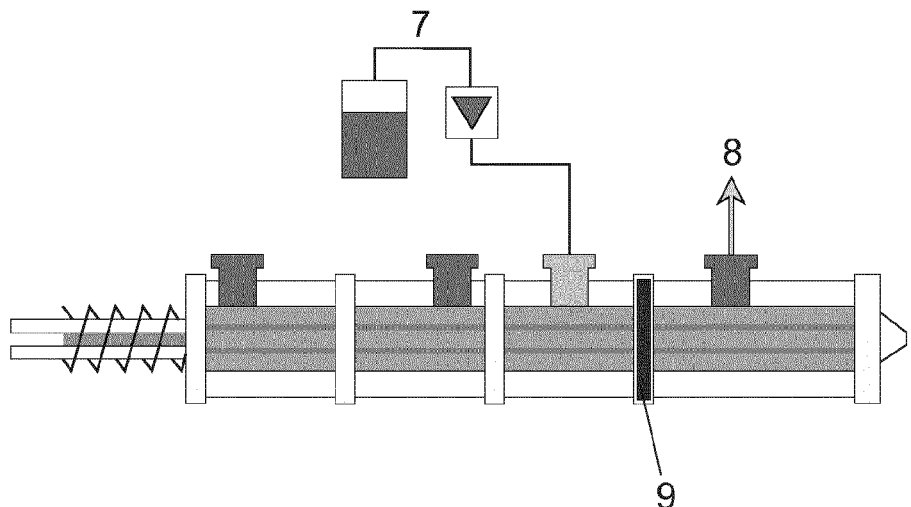
FIG. 2 illustrates a twin screw extruder in an embodiment, wherein
7: Carbon black dispersion feed line
8: Devolatization (<0.1 bar)
9: Blister

The invention claimed is:

1. An adhesive tape comprising a thermally vulcanizable, meltable pressure-sensitive adhesive, wherein the thermally vulcanizable, meltable pressure-sensitive adhesive comprises a meltable polybutadiene-polyurethane and ground sulphur, wherein the meltable polybutadiene-polyurethane comprises the chemical reaction product of
at least one polybutadiene-diol,
at least one chain extender having a hydroxyl functionality of two and a molar mass of less than or equal to 300 g/mol, and
optionally at least one polybutadiene-polyol having a number-averaged average functionality of between greater than 2.0 and less than or equal to 3.0,
with at least one aliphatic or alicyclic diisocyanate.

2. The adhesive tape according to claim 1, wherein the thermally vulcanizable, meltable pressure-sensitive adhesive further comprises one or more substances independently selected from a list consisting of at least one vulcanization accelerator, at least one filler, epoxy resins, tackifier resins, bitumens, and plasticizers.

3. The adhesive tape according to claim 1, wherein the thermally vulcanizable, meltable pressure-sensitive adhesive further comprises further auxiliaries and additives.

4. The adhesive tape according to claim 1, wherein a numerical fraction of hydroxyl groups introduced for forming the meltable polybutadiene-polyurethane and originating from at least one chain extender is between greater than or equal to 20.0% and less than or equal to 80.0%.

5. The adhesive tape according to claim 1, wherein a numerical fraction of hydroxyl groups introduced for forming the meltable polybutadiene-polyurethane and originating from an optional at least one polybutadiene-polyol having a number-averaged average functionality of between greater than 2.0 and less than or equal to 3.0 is not more than 50.0%.

6. The adhesive tape according to claim 1, wherein at least one aliphatic or alicyclic diisocyanate is or comprises at least one selected from isophorone diisocyanate and dicyclohexylmethane 4,4'-diisocyanate.

7. The adhesive tape according to claim 1, wherein a ratio of a total number of isocyanate groups to a total number of hydroxyl groups in compounds participating in a chemical reaction to provide the meltable polybutadiene-polyurethane is between greater than or equal to 0.3 and less than or equal to 1.3.

8. The adhesive tape according to claim 2, wherein the at least one filler comprises ground chalk and ground calcium oxide, the weight fraction thereof in the thermally vulcanizable, meltable pressure-sensitive adhesive together being between 10.0 and 70.0 weight percent.

9. The adhesive tape according to claim 2, wherein the at least one filler comprises ground talc, the weight fraction thereof in the thermally vulcanizable, meltable pressure-sensitive adhesive being between 10.0 wt % and 50.0 wt %.

10. The adhesive tape according to claim 1, further comprises at least one tackifier resin having a weight fraction thereof in the thermally vulcanizable, meltable pressure-sensitive adhesive being f between 1.0 wt % inclusive and 30.0 wt % inclusive, said at least one tackifier resin being a terpene resin.

11. The adhesive tape according to claim 2, wherein the at least one vulcanization accelerator is at least one selected from one or more mercapto accelerators, one or more thiuram accelerators, one or more dithiocarbamate accelerators, and a combination of two or all of these accelerators, the concentration of the at least one vulcanization accelerator in the thermally vulcanizable, meltable pressure-sensitive adhesive being between at least 0.1 wt % and not more than 15.0 wt %.

12. A process for producing the thermally vulcanizable, meltable pressure-sensitive adhesive according to claim 1, wherein a chemical reaction to give the meltable polybutadiene-polyurethane takes place with addition of a catalyst comprising bismuth and carbon.

13. A process for producing the thermally vulcanizable, meltable pressure-sensitive adhesive according to claim 1, wherein a chemical reaction to give the meltable polybutadiene-polyurethane takes place in the presence of an epoxy resin.

14. A process for producing the adhesive tape according to claim 1, wherein production takes place in a solvent-free, continuous compounding and coating operation.

15. The process according to claim 14, wherein the production takes place in a solvent-free, continuous compounding and coating operation by metered addition of the sulphur and of the optional vulcanization accelerators, fillers and also of the further auxiliaries and additives during the continuous compounding operation into the continuously operating compounding extruder.

16. The process according to claim 15, wherein the compounding extruder is a planetary roller extruder.

17. The process according to claim 16, wherein a temperature of the compounded formulation does not exceed 90° C.

* * * * *